US011666799B2

(12) United States Patent
Beyer et al.

(10) Patent No.: US 11,666,799 B2
(45) Date of Patent: Jun. 6, 2023

(54) TREADMILL WITH VERTICALLY DISPLACEABLE PLATFORM

(71) Applicant: NIKE, Inc., Beaverton, OR (US)

(72) Inventors: Jeffrey A. Beyer, Portland, OR (US); Stacy E. Stamm, Beaverton, OR (US); Jay T. Worobets, Portland, OR (US); Brian R. Brothers, Lake Orion, MI (US); Andrew James Lewis, Royal Oak, MI (US); Thomas J. Sawarynski, Jr., West Bloomfield, MI (US); Edward F. Wettlaufer, Jr., St. Clair Shores, MI (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/153,647

(22) Filed: Jan. 20, 2021

(65) Prior Publication Data

US 2021/0138298 A1     May 13, 2021

Related U.S. Application Data

(62) Division of application No. 15/991,499, filed on May 29, 2018, now Pat. No. 10,918,904.

(Continued)

(51) Int. Cl.
*A63B 22/02* (2006.01)
*A63B 22/00* (2006.01)
(Continued)

(52) U.S. Cl.
CPC ...... *A63B 22/0228* (2015.10); *A63B 22/0023* (2013.01); *A63B 22/0235* (2013.01); *A63B 24/0087* (2013.01); *F16F 9/3228* (2013.01)

(58) Field of Classification Search
CPC .............. A63B 22/0228; A63B 22/025; A63B 22/0023; A63B 22/0235; A63B 24/0087;
(Continued)

(56) References Cited

U.S. PATENT DOCUMENTS 2,257,758 A    10/1941 Murch
2,506,579 A     5/1950 Frank
(Continued)

FOREIGN PATENT DOCUMENTS

CA            1135533 A     11/1982
CA            1155318 A     10/1983
(Continued)

OTHER PUBLICATIONS http://moticont.com/voice-coil-motors.htm#:~:text=Voice%20Coil%20Motors-,Linear%20DC%20Motors%2C%20Voice%20Coil%20Motors%20(VCM)%20or%20Voice,internal%20linear%20bearings%20and%20shaft. (Year: 2012).*

(Continued)

*Primary Examiner* — Andrew S Lo
*Assistant Examiner* — Andrew M Kobylarz
(74) *Attorney, Agent, or Firm* — Shook, Hardy & Bacon L.L.P.

(57) ABSTRACT

A treadmill has a base with a vertically displaceable platform. A mechanism is provided that resists the downward movement of the platform in response to a load applied to the platform. The mechanism also rebounds the platform upwardly with a force applied to the platform in response to a decrease of a load on the platform. A support structure enables stable vertical positioning of the platform with respect to the base.

19 Claims, 17 Drawing Sheets

Related U.S. Application Data

(60) Provisional application No. 62/512,770, filed on May 31, 2017, provisional application No. 62/512,769, filed on May 31, 2017.

(51) Int. Cl.
*A63B 24/00* (2006.01)
*F16F 9/32* (2006.01)

(58) Field of Classification Search
CPC ............ A63B 71/0622; A63B 22/0285; A63B 2209/00; A63B 2071/0658; A63B 2225/50; F16F 9/3228
See application file for complete search history.

(56) References Cited

U.S. PATENT DOCUMENTS

| | | | |
|---|---|---|---|
| 3,064,797 A | 11/1962 | Wilhelm et al. | |
| 3,142,193 A | 7/1964 | Polko et al. | |
| 3,479,852 A | 11/1969 | Conrad et al. | |
| 3,731,917 A | 5/1973 | Townsend | |
| 3,762,229 A | 10/1973 | Johnson | |
| 3,870,297 A * | 3/1975 | Elder | A63B 22/025 482/7 |
| 3,921,793 A | 11/1975 | Hutchinson et al. | |
| 3,994,261 A | 11/1976 | Wedell et al. | |
| 4,193,315 A | 3/1980 | Noe | |
| 4,253,343 A | 3/1981 | Black et al. | |
| 4,566,689 A | 1/1986 | Ogden | |
| 4,602,779 A | 7/1986 | Ogden | |
| 4,635,928 A | 1/1987 | Ogden et al. | |
| 4,747,810 A | 5/1988 | Shepley et al. | |
| 4,849,666 A | 7/1989 | Hoag | |
| 4,974,831 A | 12/1990 | Dunham | |
| 4,984,810 A | 1/1991 | Stearns et al. | |
| 5,014,979 A | 5/1991 | Higgins et al. | |
| 5,015,926 A | 5/1991 | Casler | |
| 5,302,162 A | 4/1994 | Pasero | |
| 5,336,145 A * | 8/1994 | Keiser | A63B 22/025 482/54 |
| 5,336,146 A | 8/1994 | Piaget et al. | |
| 5,382,207 A | 1/1995 | Skowronski et al. | |
| 5,478,027 A | 12/1995 | Alexander, III | |
| 5,529,553 A | 6/1996 | Finlayson | |
| 5,542,892 A | 8/1996 | Buhler | |
| 5,752,879 A | 5/1998 | Berdut | |
| 5,860,894 A | 1/1999 | Dalebout et al. | |
| 5,893,530 A | 4/1999 | Alexander, III et al. | |
| 5,993,358 A * | 11/1999 | Gureghian | A63B 22/02 482/54 |
| 6,013,011 A | 1/2000 | Moore et al. | |
| 6,042,514 A * | 3/2000 | Abelbeck | A63B 22/02 482/54 |
| 6,053,848 A | 4/2000 | Eschenbach | |
| 6,117,053 A | 9/2000 | Chiu | |
| 6,202,397 B1 | 3/2001 | Watts et al. | |
| 6,287,240 B1 | 9/2001 | Trabbic | |
| 6,394,239 B1 * | 5/2002 | Carlson | F16F 9/535 188/267.2 |
| 6,409,633 B1 | 6/2002 | Abelbeck | |
| 6,436,008 B1 | 8/2002 | Skowronski et al. | |
| 6,607,469 B2 | 8/2003 | Ota | |
| 6,652,424 B2 | 11/2003 | Dalebout | |
| 6,776,740 B1 | 8/2004 | Anderson et al. | |
| 6,811,519 B2 | 11/2004 | Kuo | |
| 6,821,230 B2 | 11/2004 | Dalebout et al. | |
| 6,878,100 B2 | 4/2005 | Frykman et al. | |
| 7,156,777 B2 | 1/2007 | Dyer et al. | |
| 7,241,250 B1 * | 7/2007 | French | A63B 22/0235 482/54 |
| 7,367,926 B2 | 5/2008 | Clark | |
| 7,507,187 B2 | 3/2009 | Dyer et al. | |
| 7,513,852 B2 | 4/2009 | Wilkins et al. | |
| 7,563,203 B2 | 7/2009 | Dalebout et al. | |
| 7,645,212 B2 | 1/2010 | Ashby et al. | |
| 7,874,963 B2 | 1/2011 | Grind | |
| 8,172,729 B2 | 5/2012 | Ellis | |
| 8,597,161 B2 * | 12/2013 | Dibble | A63B 22/0056 482/52 |
| 8,968,160 B2 | 3/2015 | Cassano | |
| 8,979,709 B2 | 3/2015 | Toback et al. | |
| 9,233,267 B2 | 1/2016 | Wilkins | |
| 9,352,186 B2 | 5/2016 | Watterson | |
| 9,367,668 B2 | 6/2016 | Flynt et al. | |
| 9,370,686 B2 | 6/2016 | Lee | |
| 9,573,017 B2 | 2/2017 | Chang | |
| 10,589,146 B2 | 3/2020 | Becker et al. | |
| 10,857,421 B2 | 12/2020 | Beyer et al. | |
| 2001/0034272 A1 | 10/2001 | Sobol | |
| 2003/0224910 A1 | 12/2003 | Chang | |
| 2004/0259690 A1 | 12/2004 | Frykman et al. | |
| 2005/0009668 A1 | 1/2005 | Savettiere et al. | |
| 2005/0032610 A1 | 2/2005 | Nelson et al. | |
| 2005/0045452 A1 | 3/2005 | Iseli | |
| 2005/0164839 A1 | 7/2005 | Watterson et al. | |
| 2005/0209060 A1 | 9/2005 | Lull | |
| 2006/0160669 A1 | 7/2006 | Lizarralde | |
| 2007/0281832 A1 | 12/2007 | Alessandri et al. | |
| 2008/0125292 A1 | 5/2008 | Simazu | |
| 2008/0242511 A1 | 10/2008 | Munoz et al. | |
| 2008/0312047 A1 | 12/2008 | Feng | |
| 2010/0160115 A1 | 6/2010 | Morris et al. | |
| 2011/0111166 A1 | 5/2011 | Chang | |
| 2011/0152037 A1 | 6/2011 | Wu et al. | |
| 2011/0281692 A1 | 11/2011 | Maresh | |
| 2012/0021875 A1 | 1/2012 | Karl | |
| 2012/0157268 A1 | 6/2012 | Arst | |
| 2012/0184409 A1 | 7/2012 | Beal | |
| 2013/0267386 A1 * | 10/2013 | Her | A63B 22/02 482/54 |
| 2014/0011642 A1 | 1/2014 | Astilean | |
| 2014/0274577 A1 | 9/2014 | Beard et al. | |
| 2015/0151156 A1 | 6/2015 | Piaget et al. | |
| 2016/0023045 A1 | 1/2016 | Dalebout | |
| 2016/0144225 A1 | 5/2016 | Dalebout et al. | |
| 2016/0287930 A1 | 10/2016 | Moser | |
| 2016/0289006 A1 | 10/2016 | deLore et al. | |
| 2016/0367851 A1 | 12/2016 | Astilean et al. | |
| 2017/0225023 A1 | 8/2017 | Crist et al. | |
| 2017/0282006 A1 | 10/2017 | Walter et al. | |
| 2018/0043207 A1 | 2/2018 | Moser | |
| 2018/0217662 A1 * | 8/2018 | Smoot | A63B 24/0021 |
| 2018/0345068 A1 | 12/2018 | Beyer et al. | |
| 2018/0361194 A1 | 12/2018 | Corbalis et al. | |
| 2019/0030399 A1 * | 1/2019 | D'Alesio | A63B 21/00181 |
| 2019/0134457 A1 | 5/2019 | Chen et al. | |
| 2019/0366149 A1 | 12/2019 | Crist et al. | |
| 2022/0040528 A1 | 2/2022 | Manzke et al. | |
| 2022/0062698 A1 | 3/2022 | Tsai | |

FOREIGN PATENT DOCUMENTS

| | | |
|---|---|---|
| CN | 2245471 Y | 1/1997 |
| CN | 1188191 C | 2/2005 |
| CN | 202446766 U | 9/2012 |
| CN | 104801012 A | 7/2015 |
| CN | 106390369 A | 2/2017 |
| EP | 1606026 A2 | 12/2005 |
| EP | 1400263 B1 | 3/2007 |
| EP | 1815887 A1 | 8/2007 |
| EP | 2762204 A1 | 8/2014 |
| EP | 2673056 A4 | 9/2015 |
| GB | 1144818 A | 3/1969 |
| GB | 2196266 A | 4/1988 |
| KR | 2001-0083808 A | 9/2001 |
| WO | 01/30464 A1 | 5/2001 |
| WO | 01/56664 A1 | 8/2001 |
| WO | 2007/016555 A2 | 2/2007 |
| WO | 2008/099429 A1 | 8/2008 |
| WO | 2013/138375 A1 | 9/2013 |
| WO | 2016/065077 A1 | 4/2016 |

(56) References Cited

FOREIGN PATENT DOCUMENTS

OTHER PUBLICATIONS

Office Action received for European Patent Application No. 18733432.1, dated Feb. 11, 2021, 5 pages.
Extended European Search Report received for European Patent Application No. 21172250.9, dated Aug. 9, 2021, 12 pages.
"Bowflex TreadClimber TC200", Bowflex, Available online at: <https://web.archive.org/web/20171202032522/http://www.bowflex.com/treadclimber/tc200/100457.html>, Accessed on Jun. 7, 2018, pp. 1-6.
"Commercial 1750", NordicTrack, Available online at: <https://web.archive.org/web/20160831055040/https://www.nordictrack.com/treadmills/commercial-1750-treadmill>, Accessed on Aug. 2016, 8 pages.
"Commercial Treadmills", True Fitness, Available online at: <https://web.archive org/web/20160320211126/http://www.truefitness.com/commercial-fitness/treadmills/>, Accessed on Jun. 7, 2018, 1 page.
"Cybex Treadmills", Cybex, Available online at: <http://web.archive org/web/20120330034557/http://www.cybexintl.com/products/treadmills.aspx>, Accessed on Jun. 7, 2018, 2 pages.
"Experience—Treadmill", Chinesport Rehabilitation and Medical Equipment, Available online at :<https://web.archive.org/web/20170528072025/http://www.chinesport.com/catalogue/treadmills/fitnessreadmills/78856-camminatore-experience/>, Jun. 17, 2014, 4 pages.
"FORCE: Test Your Limits", Woodway, Available online at: <http://web.archive.org/web/20151024092756/http://www.woodway.com/products/force>, Oct. 24, 2015, 9 pages.
"Stamina InMotion II Treadmill", Stamina Products Inc., Available online at: <https://web.archive.org/web/20110103001159/http://www2.staminaproducts.com/products/product_details.cfm?PID=45-1002A&cat=Treadmills, Accessed on Jun. 7, 2018, pp. 1-4.
"How to Adjust a Treadmill Drive Belt", Treadmill Doctor, Available online at: <http://web.archive.org/web/20071214194042/http://www.treadmilldoctor.com/treadmill-drive-belt-adjustment>, Dec. 14, 2007, 1 page.
"The Boston Marathon GSX Treadmill", Gym Source, Available online at: <https://web.archive.org/web/20151229050443/http://www.gymsource.com/boston-marathon-gsx-treadmill>, Accessed on Jun. 7, 2018, pp. 1-4.
"Carbon Fiber", Polymer Science Learning Center, Available on Internet at: <https//pslc.ws/macrog/carfib.htm#:-:text=Carbon%20fiber%20is%20a%20polymer,sheets%20look%20like%20chicken%20wire>, 2022, 1 page.
Non-Final Office Action received for U.S. Appl. No. 17/180,396, dated Apr. 13, 2022, 12 pages.
Non-Final Office Action received for U.S. Appl. No. 17/103,574, dated Jun. 30, 2022, 20 pages.
Notice of Allowance received for U.S. Appl. No. 17/180,396, dated Jul. 14, 2022, 8 pages.
Notice of Allowance received for U.S. Appl. No. 17/103,574, dated Oct. 20, 2022, 12 pages.
Office action received for European Patent Application No. 18733432.1, dated Aug. 11, 2022, 4 pages.

\* cited by examiner

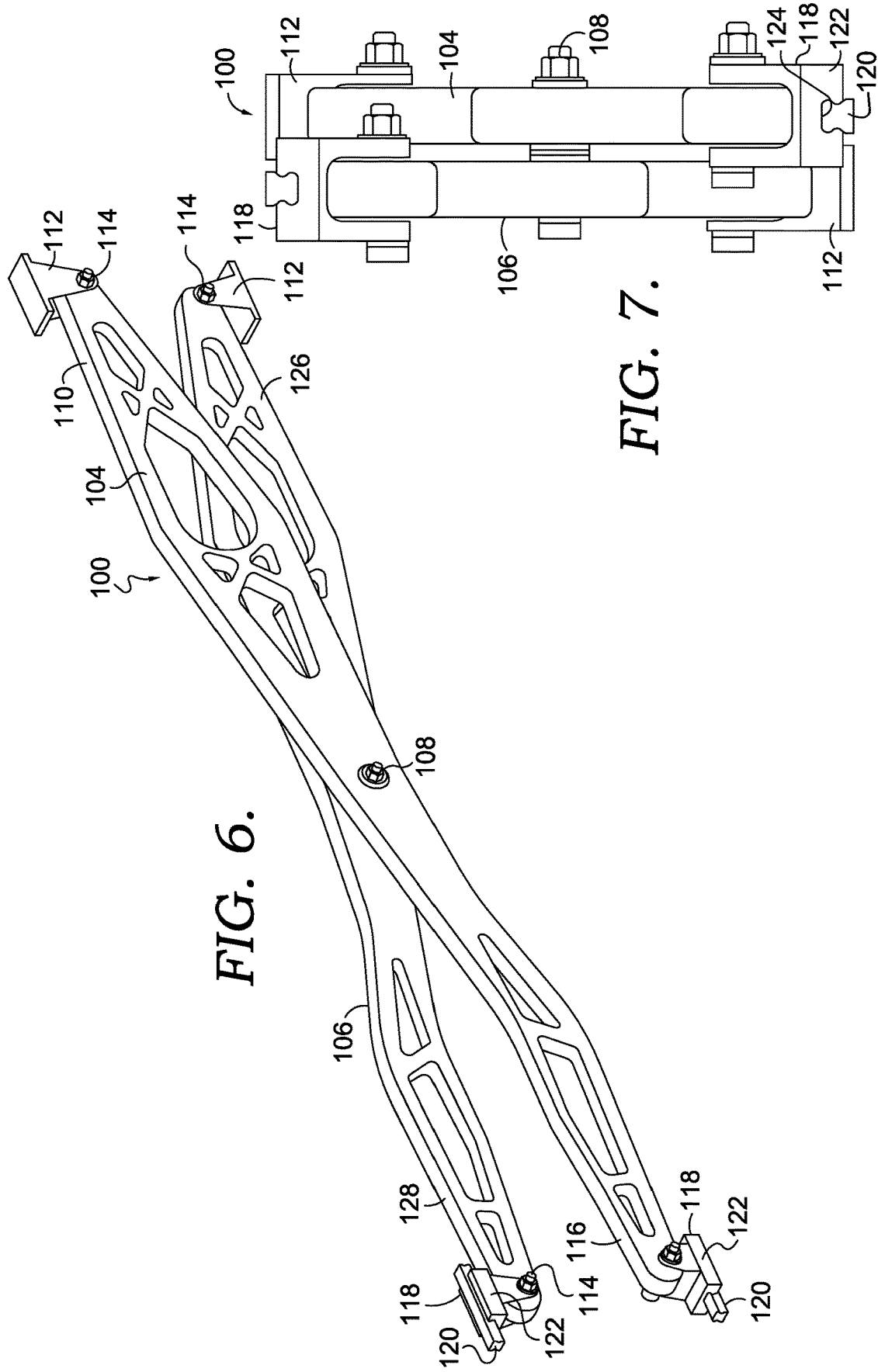

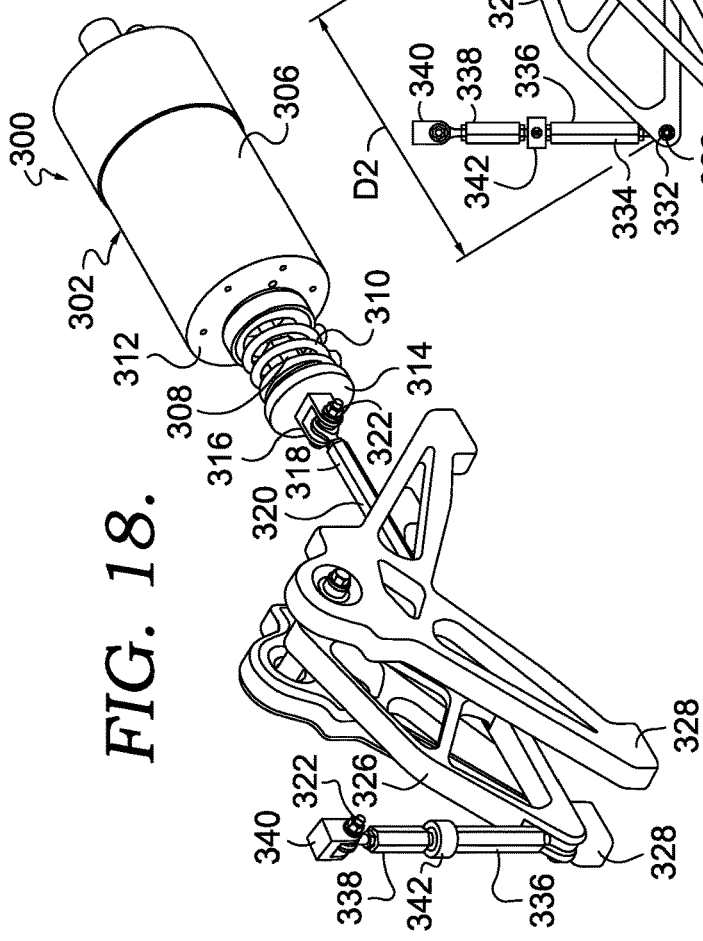
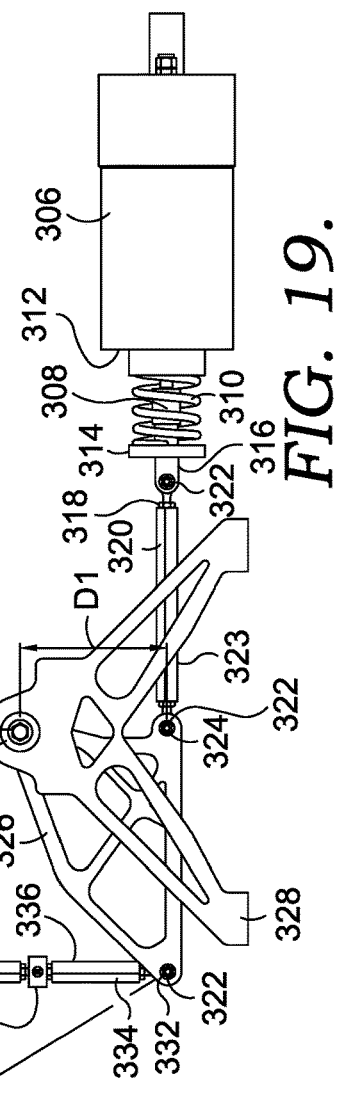
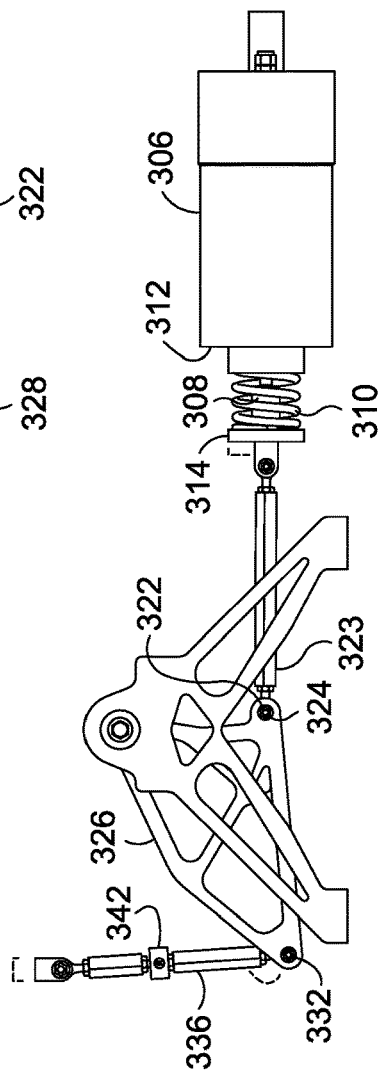
FIG. 18.
FIG. 19.
FIG. 20.

TREADMILL WITH VERTICALLY DISPLACEABLE PLATFORM

CROSS-REFERENCE TO RELATED APPLICATIONS AND PRIORITY CLAIM

This application is a divisional of co-pending U.S. patent application Ser. No. 15/991,499, filed May 29, 2018, titled "Treadmill with Vertically Displaceable Platform," which claims priority to U.S. Provisional Patent App. No. 62/512,769, filed May 31, 2017, titled "Treadmill with Vertically Displaceable Platform" and also to U.S. Provisional Patent App. No. 62/512,770, filed May 31, 2017, titled "Treadmill Dynamic Belt Tensioning System." These applications are assigned to the same entity as the present application, and are each incorporated herein by reference in the entirety. This application is also related by subject matter to U.S. patent Application Ser. No. 15/991,891, filed May 29, 2018, titled "Treadmill with Dynamic Belt Tensioning System," which also claims priority to the two above-listed provisional applications, and which is also assigned to the same entity as the present application, and which is also incorporated herein by reference in the entirety.

TECHNICAL FIELD

This disclosure describes a treadmill with a vertically displaceable user engagement platform.

BACKGROUND

A treadmill has an endless belt powered by a drive roller. The belt is the surface upon which a user engages in an activity. The endless belt results in the user being able to engage in an activity in a relatively defined space.

SUMMARY

This summary is intended to introduce a selection of concepts in a simplified form that are further described below in the detailed description section of this disclosure. This summary is not intended to identify key or essential features of the claimed subject matter, and is also not intended to be used as an aid in isolation to determine the scope of the claimed subject matter.

In brief, and at a high level, this disclosure describes, among other things, treadmills, including those having vertically displaceable/controllable platforms. In one aspect hereof, a treadmill includes a mechanism coupled to the platform and to a base of the treadmill to resist downward movement of the platform in response to a load applied to the platform and also to rebound the platform upward with a force applied to the platform in response to a decrease in load applied to the platform. In another aspect, a support structure is coupled to the platform and to the mechanism to provide stable vertical positioning of the platform with respect to the base. In other aspects, a displacement-based lighting system is integrated with the treadmill to provide visual/color-based indicators for various functions and states of the treadmill. In another aspect, a position-sensor-based speed control system is integrated with the treadmill to assist in controlling a speed of the treadmill based on a position of a user/runner. In yet another aspect, a method of operating a treadmill is provided.

In one aspect hereof, a vertical displacement apparatus for use in a treadmill is provided. The treadmill comprises a base and a training engagement platform supported above the base by a first support structure, the first support structure including a first scissor arm connected on a first end to the platform and connected on a second end to the base and a second scissor arm connected on a first end to the base and connected on a second end to the platform. Further, an intermediate portion of the first scissor arm is pivotally attached to an intermediate portion of the second scissor arm so that pivoting of the first and second scissor arms with respect to one another results in support of the platform at various vertical displacements.

In another aspect hereof, an adjustable treadmill is provided. The treadmill comprises a base, a platform movably coupled to the base, a drive roller rotatably coupled to the base, an endless belt movably coupled to the drive roller and extending over a top surface of the platform, a resistance/rebound mechanism coupled to the base and to the platform and capable of providing displacement resistance in a first direction and rebound responsiveness in an opposite second direction, and a control system capable of applying input control signals to the resistance/rebound mechanism.

In another aspect hereof, an adjustable treadmill is provided. The treadmill comprises a base, a platform movably coupled to the base, a drive roller rotatably coupled to the base, an endless belt movably coupled to the drive roller and extending over a top surface of the platform, a linear actuator mounted to the base that has a piston that is capable of extension and retraction, such that the linear path of the piston is generally parallel to the platform, and a bell crank pivotally mounted to the base and having a first end coupled to the piston and a second end coupled to the platform. The bell crank converts the linear path of the piston approximately perpendicular to the platform.

In another aspect hereof, an exercise engagement platform for a treadmill is provided. The treadmill comprises a first layer of metal, a second layer of carbon fiber, and a third layer of foam.

In another aspect, a method of operating a treadmill with a base and a platform movably attached to the base is provided. The method comprises resisting the downward movement of the platform in response to a control input indicating a load is applied to the platform and rebounding the platform upwards with a force applied to the platform in response to a control input indicating a decrease of a load on the platform.

DESCRIPTION OF THE DRAWINGS

Aspects hereof are described in detail herein with reference to the attached drawing figures, in which like numerals refer to like elements, wherein:

FIG. 6 depicts a top perspective view of the longitudinal pair of scissor arms of FIG. 5, in accordance with an aspect hereof;

FIG. 7 depicts an end elevation view of the longitudinal pair of scissor arms of FIG. 5, in accordance with an aspect hereof;

FIG. 18 depicts a top perspective view of one of the resistance/rebound mechanisms of FIG. 15, in accordance with an aspect hereof;

FIG. 19 depicts a side elevation view of the resistance/rebound mechanism of FIG. 18 in a first position corresponding to the user platform being at a first vertical height, in accordance with an aspect hereof;

FIG. 20 depicts a side elevation view of the resistance/rebound mechanism of FIG. 18 in a second position corresponding to the user platform being at a second vertical height, in accordance with an aspect hereof;

DETAILED DESCRIPTION

The subject matter of this disclosure is described herein to meet statutory requirements. However, this description is not intended to limit the scope hereof. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various steps or blocks except when the order is explicitly described and required.

Figure 1:
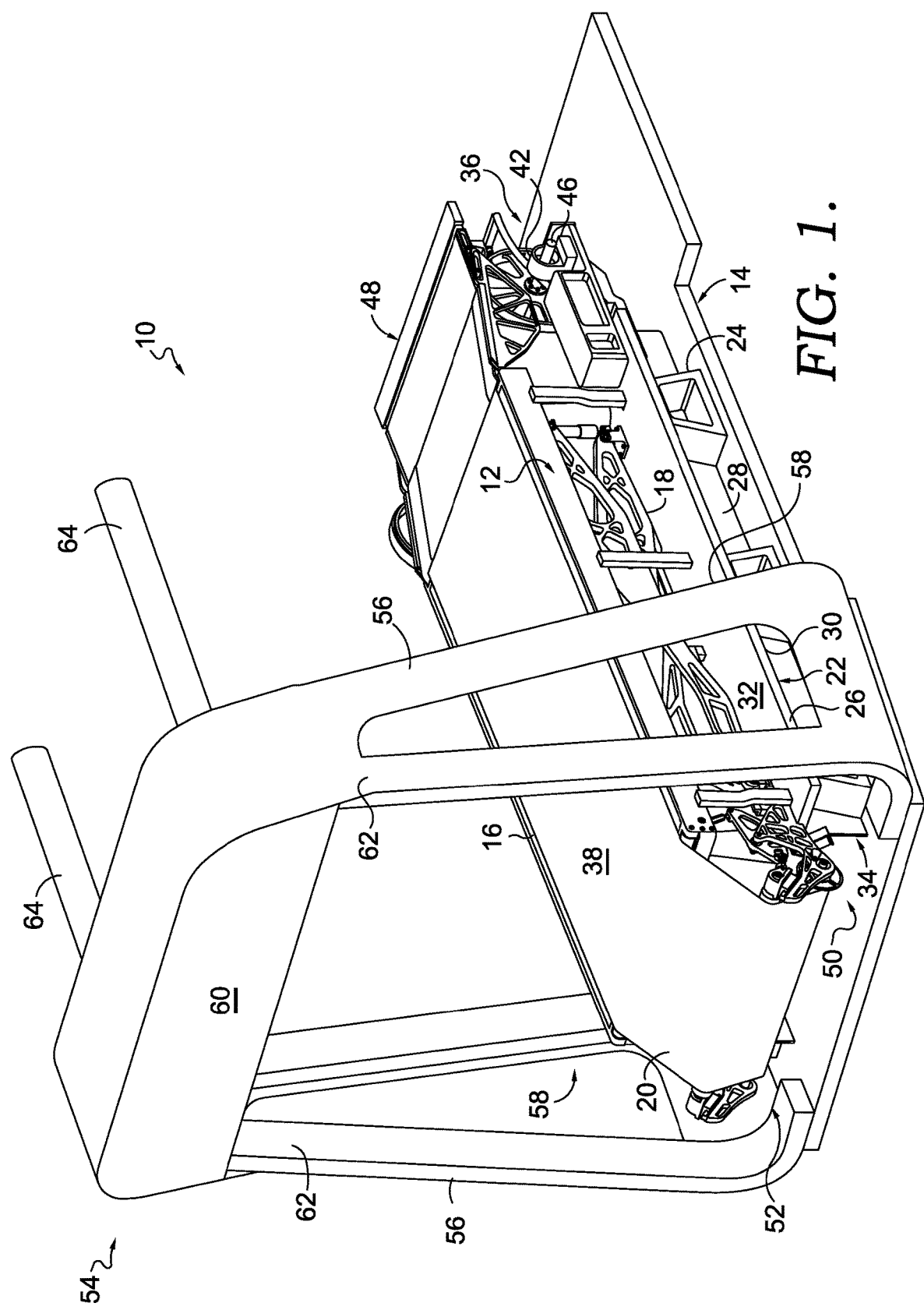
FIG. 1 depicts a top perspective view of a treadmill with a vertically displaceable user platform, in accordance with an aspect hereof.

Referring to FIG. 1, a treadmill 10 having an exemplary vertically displaceable platform 12 is depicted. The treadmill 10 has a base 14 for supporting the treadmill 10 on a suitable support surface. The platform 12 is supported above the base 14 and is vertically movable to a number of different vertical locations in response to user interaction on an upper surface 16. More specifically, the platform 12 is supported above the base 14 to allow the platform 12 to move relative to the base 14 in an up and down manner. The purpose of the up and down movement of the platform 12 is to accommodate downward force exerted by a user on the upper surface 16 when preforming, for instance, a running or walking motion. During a running motion, for example, the platform 12 may be displaced downwardly with a resistance force as a user's foot strikes the platform 12. Still further, as the user's foot is removed during a running motion, the platform may be moved upwardly with a rebound force in preparation for the user's other foot striking the upper surface 16. An exemplary support structure for supporting the platform 12 for vertical movement above base 14 is a vertical motion control mechanism 18, as will be more fully described below.

Figure 2:
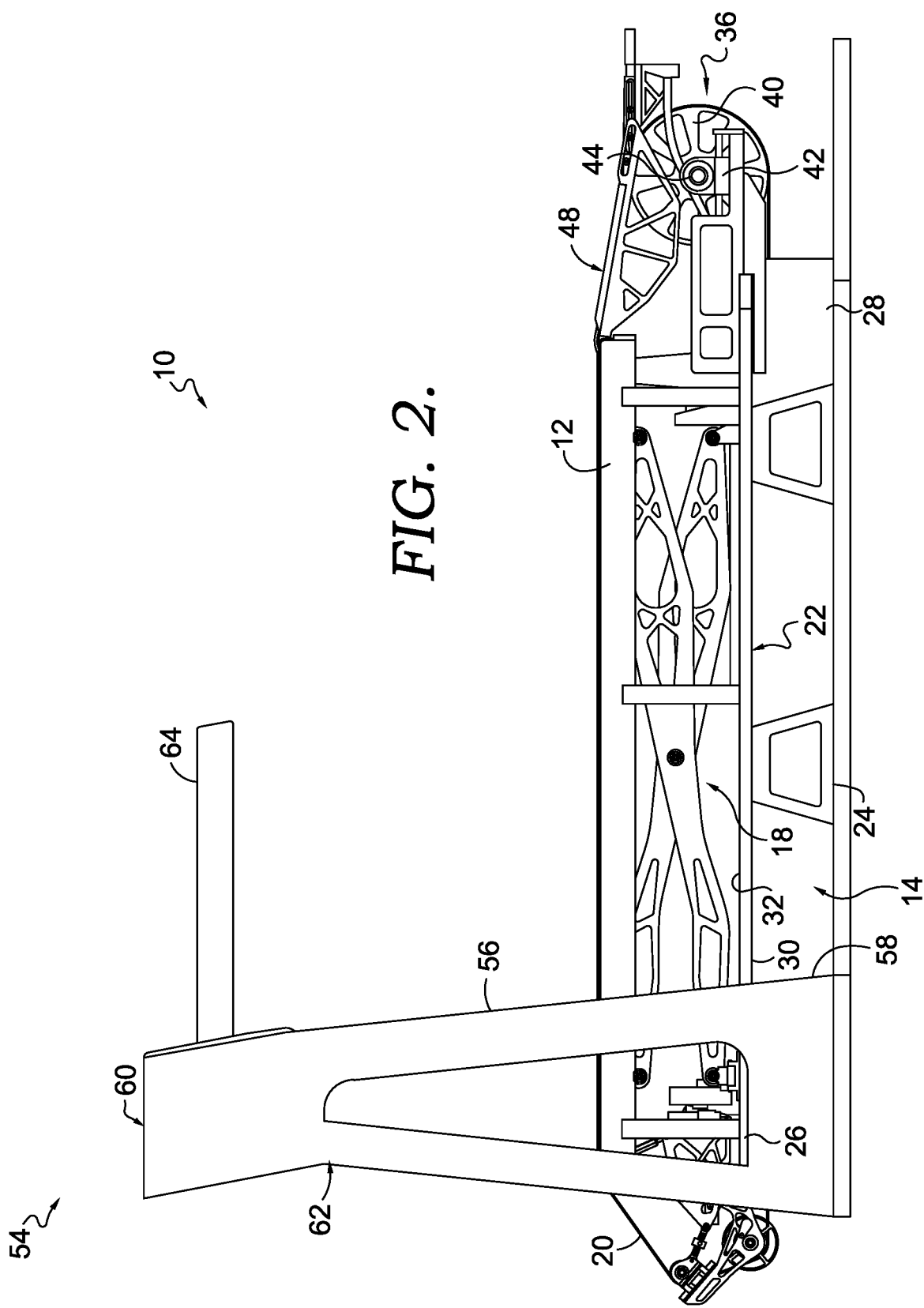
FIG. 2 depicts a side elevation view of the treadmill of FIG. 1, in accordance with an aspect hereof.
Figure 3:
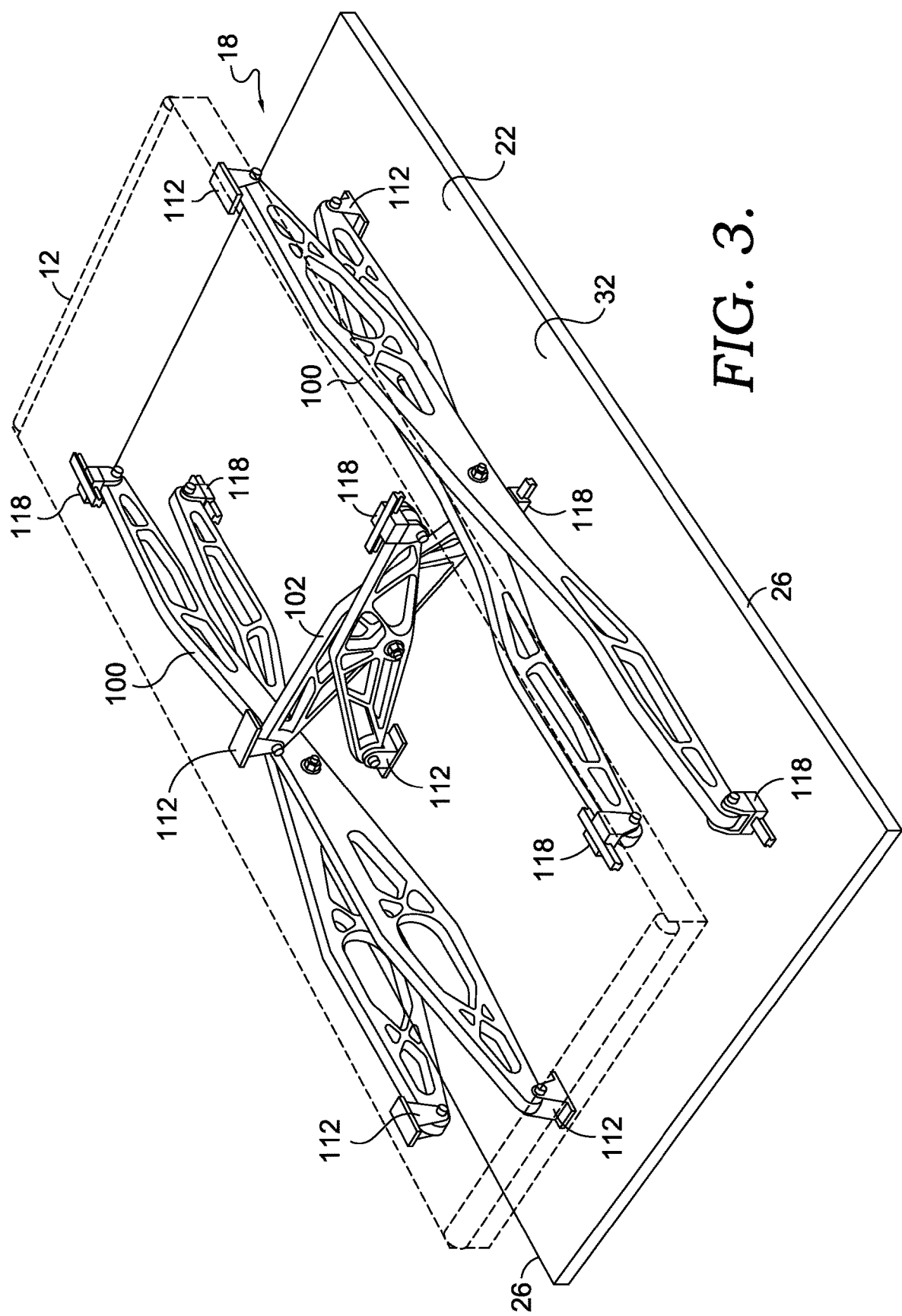
FIG. 3 depicts a top perspective view of a vertical displacement mechanism with a user platform shown in dashed lines, in accordance with an aspect hereof.
Figure 4:
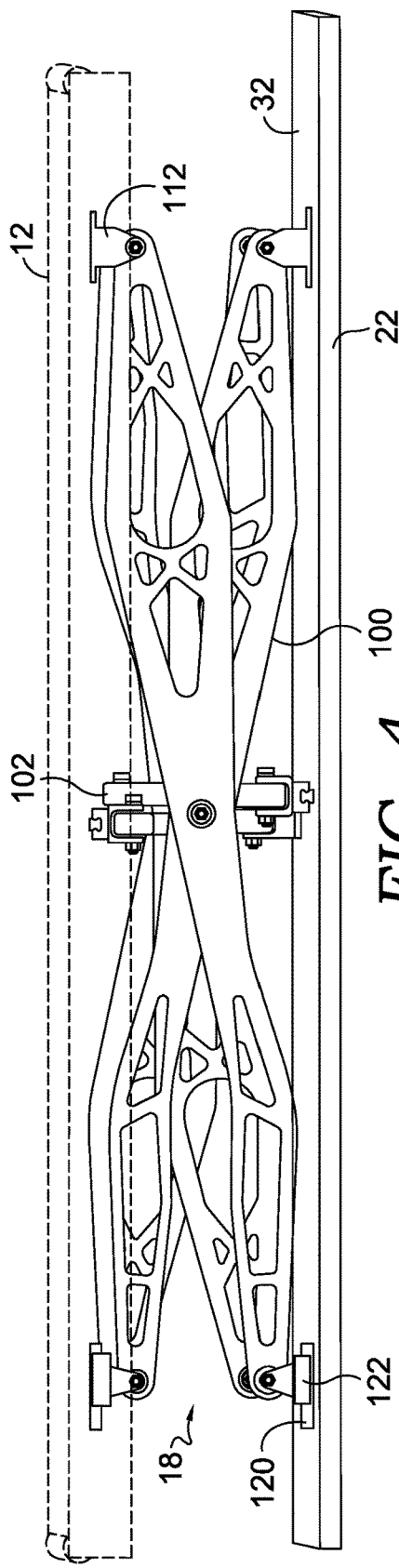
FIG. 4 depicts a side elevation view of the vertical displacement mechanism of FIG. 3 with a user platform shown in dashed lines, in accordance with an aspect hereof.
Figure 5:
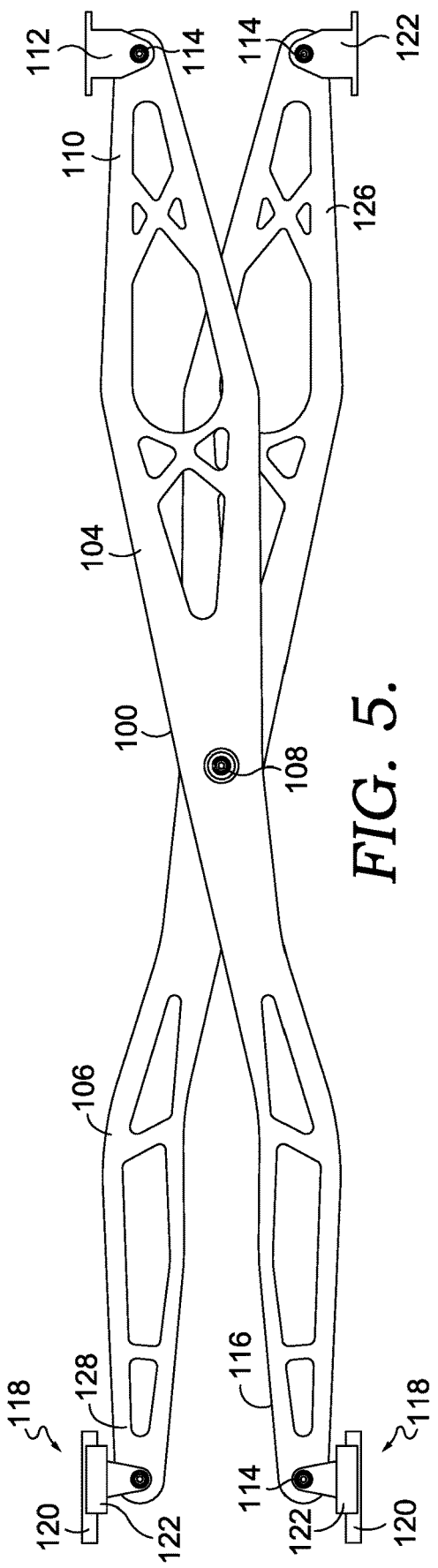
FIG. 5 depicts a side elevation view of a longitudinal pair of scissor arms of the displacement mechanism of FIG. 4, in accordance with an aspect hereof.
Figure 8:
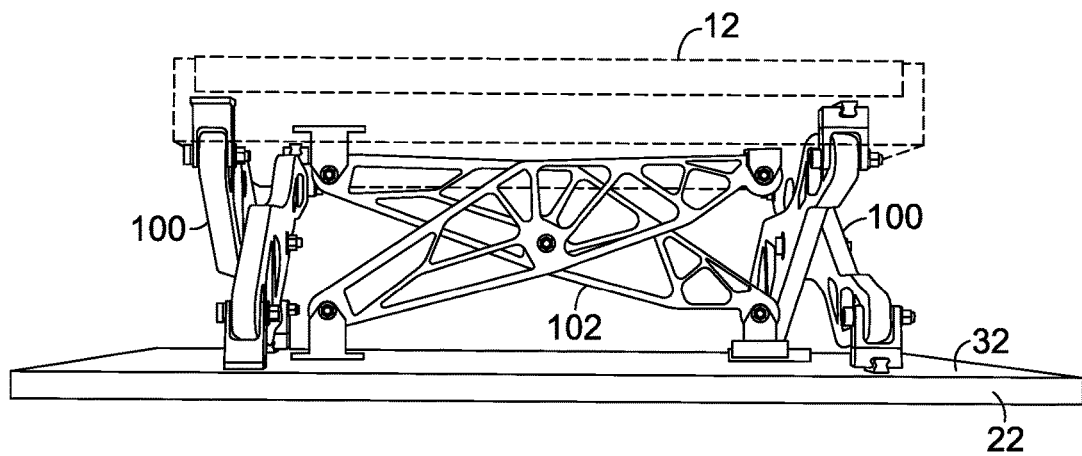
FIG. 8 depicts an end elevation view of the vertical displacement mechanism of FIG. 3 with a user platform shown in dashed lines, in accordance with an aspect hereof.
Figure 9:
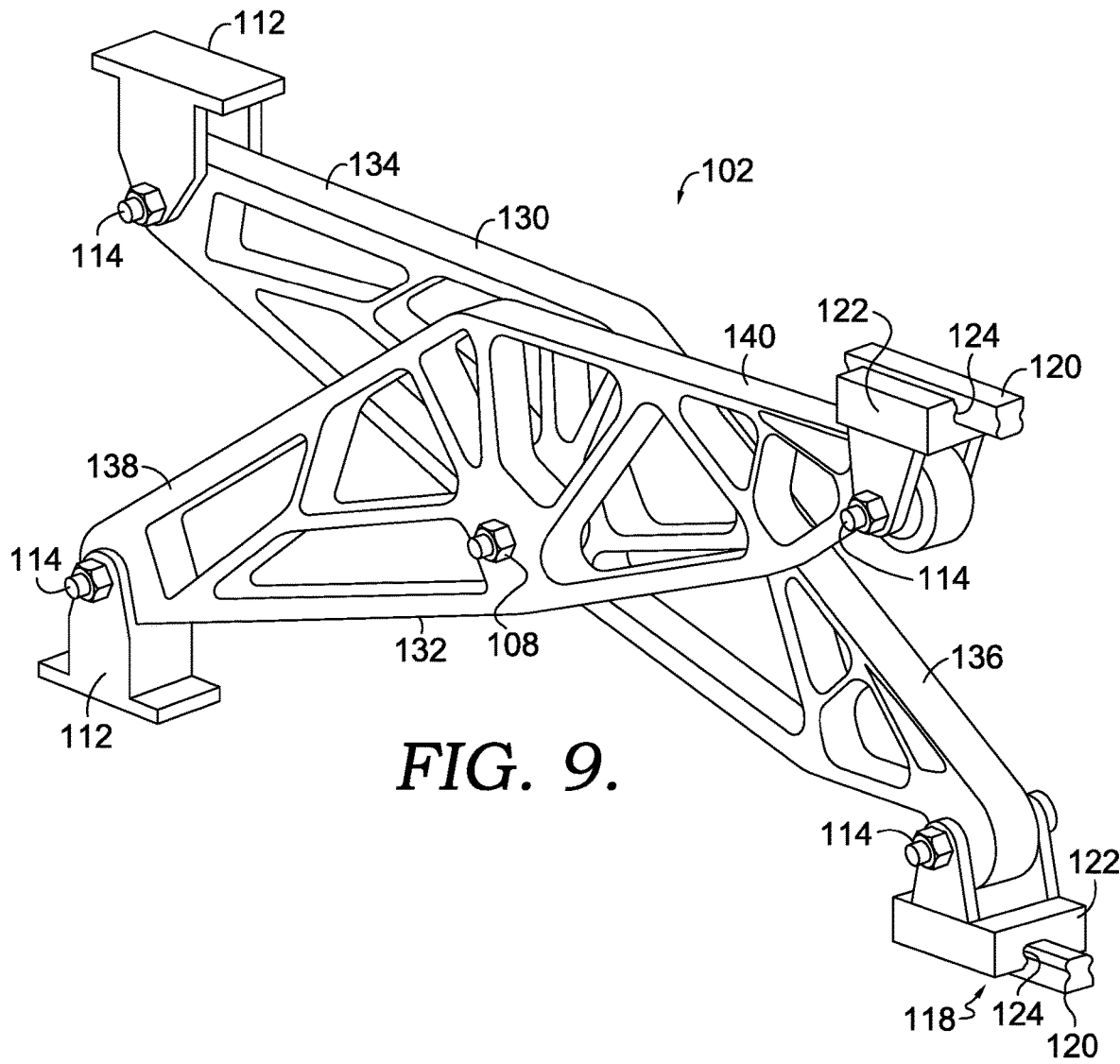
FIG. 9 depicts a top perspective view of a lateral pair of scissor arms of the displacement mechanism of FIG. 8, in accordance with an aspect hereof.
Figure 10:
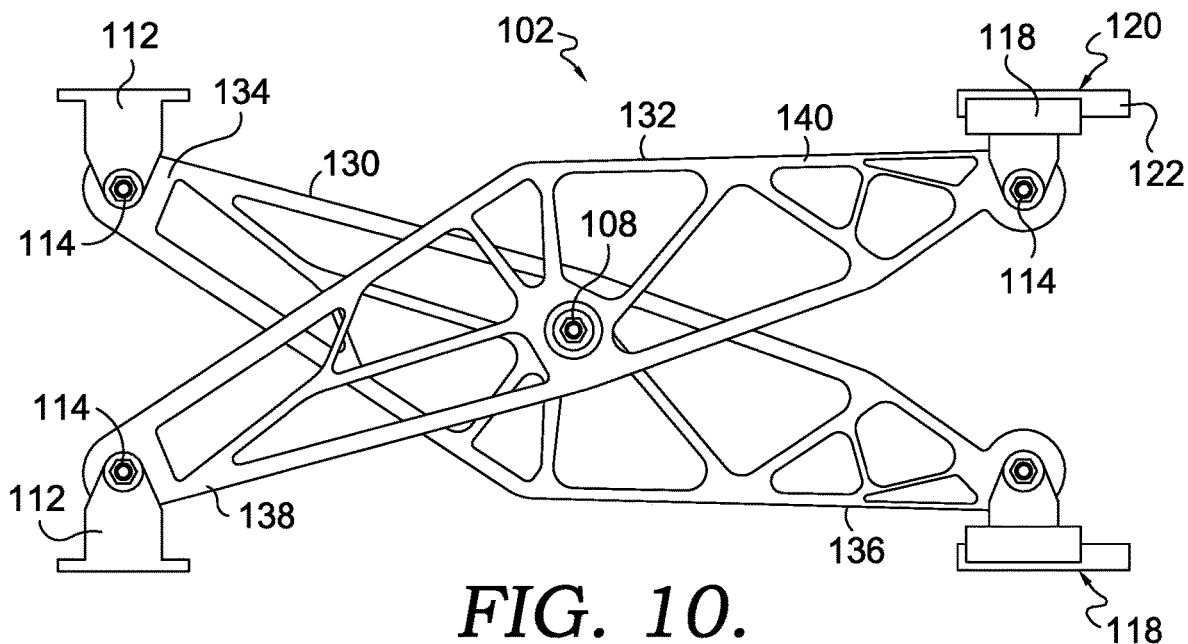
FIG. 10 depicts a side elevation view of the lateral pair of scissor arms of FIG. 9, in accordance with an aspect hereof.
Figure 11:
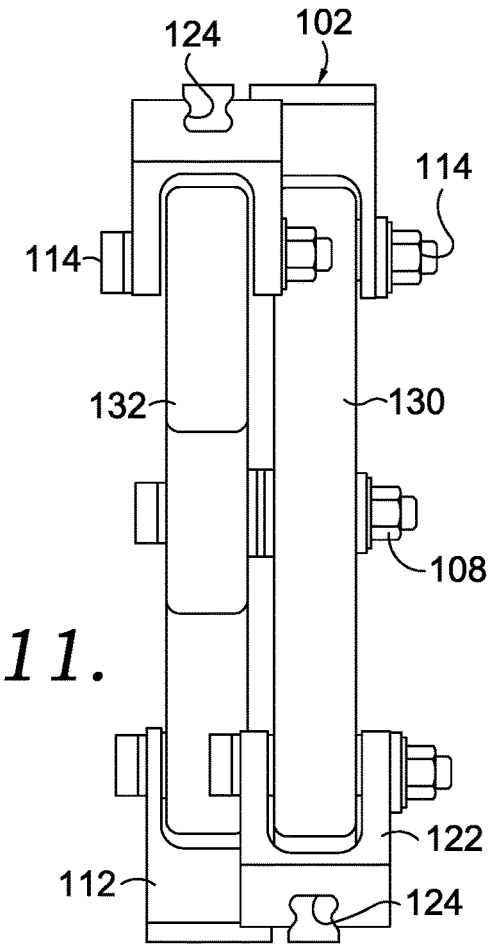
FIG. 11 depicts an end elevation view of the lateral pair of scissor arms of FIG. 9, in accordance with an aspect hereof.

Referring to FIGS. 1-2, the treadmill 10 also has an endless belt 20 that provides the moving surface for a user to engage during usage of the treadmill 10. More specifically, the belt 20 has a fixed circumference and moves over the upper surface 16 of the platform 12. Thus, as a user, for instance, walks or runs, the belt 20 is moved beneath the user's feet to allow walking or running at a single location. In addition to moving over the upper surface 16, the belt 20 also moves under a bottom plate 22 of the base 14. More specifically, referring to FIGS. 1-2, the bottom plate 22 is supported above a ground surface by a plurality of generally trapezoidal legs 24 that are also part of the base 14. The legs 24 are positioned along opposite edges 26 of the plate 22. Still further, the legs 24 along each edge 26 are connected by a support rib 28 extending downwardly from a lower surface 30 of the bottom plate 22. The plate 22 also includes an upper surface 32. The provision of a support rib 28 along each side of the bottom plate 22 defines a cavity 34 through which the belt 20 passes adjacent the lower surface 30 of the bottom plate 22. In this manner, the belt 20 is able to run in a continuous loop along the upper surface 16 of the platform 12 and along the lower surface 30 of the bottom plate 22 of the base 14.

Referring to FIGS. 1-2, a belt drive mechanism 36 is depicted. The belt drive mechanism 36 serves to provide the endless motion to the belt 20 so that the user has a continuous running/walking surface as the user moves across the upper surface 38 of the belt 20. The belt drive mechanism 36 is used to adjust the speed at which the user runs or walks. Any suitable control system can be used to adjust the speed of the belt drive mechanism 36 and correspondingly the speed of the belt 20.

The belt drive mechanism 36 includes a drive roller 40 rotatably mounted to the base 14 by a pair of mounting brackets 42 positioned on opposite sides of the base 14. Only one of the mounting brackets 42 is depicted in FIGS. 1 and 2. The mounting brackets 42 extend upwardly from the upper surface 32 of the plate 22 of the base 14 and each provide a pivot bearing 44 for receiving an axle 46 of the drive roller 40. The provision of the axle 46 rotatably mounted in the pivot bearings 44 allows the rotating motion of the drive roller 40. The drive roller 40 is coupled to any suitable power source to drive the rotating motion of the drive roller 40 and correspondingly the belt 20. The power source is not depicted in the figures, but can include, for example, an electric motor or a hydraulic motor drivably coupled to the drive roller 40 by, for instance, a belt or chain system. The power source can also be directly acting on the axle 46 to accomplish the rotating motion.

Referring to FIGS. 1-2, the treadmill 10 also includes a transition framework 48 for ensuring smooth transition of the belt 20 between the base 14 and the platform 12, especially as the platform 12 is displaced between a number of vertical locations with respect to the base 14 during operation of the treadmill 10. The transition framework 48 also provides a stable surface that the user can use to get onto and off of the platform 12.

Referring to FIGS. 1-2, a dynamic belt tensioning mechanism 50 is depicted and is disposed adjacent a forward end 52 of the treadmill 10. The tensioning mechanism 50 provides substantially constant tension on the belt 20 as the platform 12 moves up and down in relation to the base 14. More specifically, the belt 20 has a fixed circumference. As the platform 12 moves up and down, the spatial relationship between the platform 12 and the base 14 is dynamically changing. Without the belt tensioning mechanism 50, slack may exist in the belt 20 as the platform 12 moves downwardly towards the base 14. This slack would result in possible disengagement of the belt 20 from the drive roller 40. Still further, the slack may result in an unstable running surface on the upper surface 38 of the belt 20. The belt tensioning mechanism 50 provides a substantially constant tension in the belt 20 no matter the relative vertical position of the platform 12 above the base 14.

Referring to FIGS. 1-2, the platform 12 further includes an operator support frame 54 that includes a pair of vertically extending pillars 56 fixedly mounted to opposite sides of the base 14 adjacent the lower ends 58 of the pillars 56. The operator support frame 54 further includes a console 60 mounted between and adjacent to the upper ends 62 of the pillars 56. A pair of bracing arms 64 extend rearwardly from opposite sides of the console 60 to provide lateral support and stability for a user as they engage with the platform 12. The console 60 can include various sensors (as will be more fully described below) and displays if desired to monitor or inform the user.

Vertical Motion Control Mechanism

Referring to FIGS. 3-11, the vertical control mechanism 18 is depicted. The vertical control mechanism 18 allows vertical motion of and minimizes roll and pitch of the platform 12. The control mechanism 18 includes a parallel pair of longitudinal scissor frameworks 100 positioned adjacent the opposite edges 26 of the bottom plate 22 of the base 14 and also a lateral scissor framework 102 positioned between and perpendicular to the longitudinal frameworks 100 near the midpoint of the plate 22.

Referring to FIGS. 4-7, each longitudinal scissor framework 100 includes a first scissor arm 104 pivotally mounted to a second scissor arm 106 at a pivot/bearing arrangement 108. A first/upper end 110 of the first scissor arm 104 is pivotally connected to the platform 12 via a pivot/bearing mounting bracket 112 and a pivot/bearing 114. A second/lower end 116 of the first scissor arm 104 is slidably mounted to the upper surface 32 of the bottom plate 22 via a slide arrangement 118. The slide arrangement 118 includes a male protrusion 120 fixedly mounted to the upper surface 32 and a female mounting bracket 122 pivotally mounted to the second/lower end 116 via a pivot/bearing 114. The female bracket 122 is able to slide along the male protrusion 120 via a groove 124 formed in the female bracket 122. The slide arrangement 118 can be a profile rail linear bearing or any other suitable sliding/bearing mechanism.

A first/lower end 126 of the second scissor arm 106 is pivotally connected to the upper surface 32 of the plate 22 via a pivot/bearing mounting bracket 112 and a pivot/bearing 114. A second/upper end 128 of the second scissor arm 106 is slidably mounted to the platform 12 via a slide arrangement 118. The slide arrangement 118 includes a male protrusion 120 fixedly mounted to the platform 12 and a female mounting bracket 122 pivotally mounted to the second/upper end 128 via a pivot/bearing 114.

Referring to FIGS. 8-11, the lateral scissor framework 102 includes a first scissor arm 130 pivotally mounted to a second scissor arm 132 at a pivot/bearing 108. A first/upper end 134 of the first scissor arm 130 is pivotally connected to the platform 12 via a pivot/bearing mounting bracket 112 and a pivot/bearing 114. A second/lower end 136 of the first scissor arm 130 is slidably mounted to the upper surface 32 of the bottom plate 22 via a slide arrangement 118. The slide arrangement 118 includes a male protrusion 120 fixedly mounted to the upper surface 32 and a female mounting bracket 122 pivotally mounted to the second/lower end 136 via a pivot/bearing 114. The female bracket 122 is able to slide along the male protrusion 120 via a groove 124 formed in the female bracket 122.

A first/lower end 138 of the second scissor arm 132 is pivotally connected to the upper surface 32 of the plate 22 via a pivot/bearing mounting bracket 112 and a pivot/bearing 114. A second/upper end 140 of the second scissor arm 132 is slidably mounted to the platform 12 via a slide arrangement 118. The slide arrangement 118 includes a male protrusion 120 fixedly mounted to the platform 12 and a female mounting bracket 122 pivotally mounted to the second/upper end 140 via a pivot/bearing 114.

The provision of the parallel pair of longitudinal scissor frameworks 100 and the lateral scissor framework 102 provides a stable support to allow the up and down vertical movement of the platform 12 relative to the base 14. More specifically, the connection points of the frameworks 100 and 102 are positioned generally at all four corners of the platform 12 and also at the midpoint along the longitudinal sides of the platform 12. In this manner, roll and pitch of the platform 12 may be minimized. The slide arrangements 118 allow the pivoting action of the scissor arms of the longitudinal scissor frameworks 100 and the lateral scissor framework 102. This pivoting action of the arms allows the stable vertical movement of the platform 12 relative to the base 14. Still further, the friction and wear associated with the vertical movement of the platform 12 is limited due to the limited friction points of the pivot/bearings 108 and 114 and the slide arrangements 118. Wear, friction, and inertia may be reduced because of the limited ratio of rotation of the pivot/bearings 108 and 114 and the limited linear displacement on the linear bearing/slide arrangements 118. Additionally due to the ratios of the arms of the scissor frameworks 100 and 102, inertia may be reduced.

Stiff Lightweight Treadmill Platform

Figure 12:
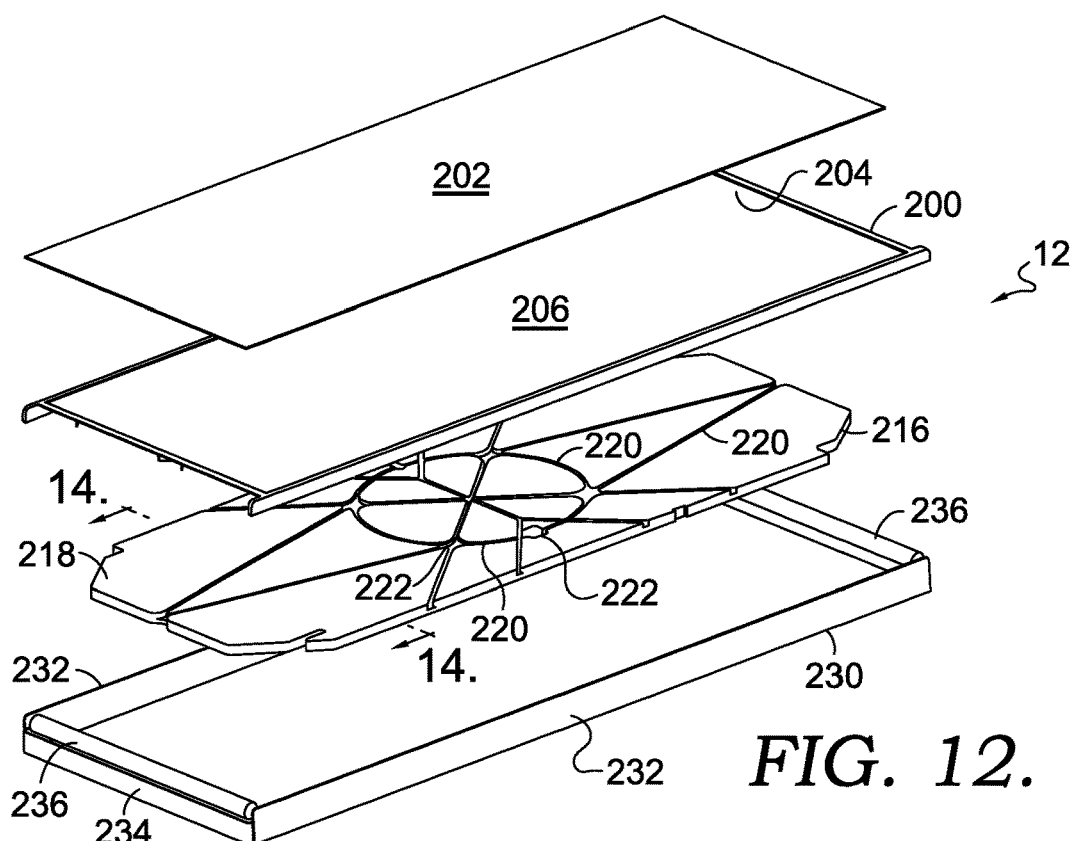
FIG. 12 depicts a top exploded perspective view of the vertically displaceable user platform, in accordance with an aspect hereof.
Figure 14:
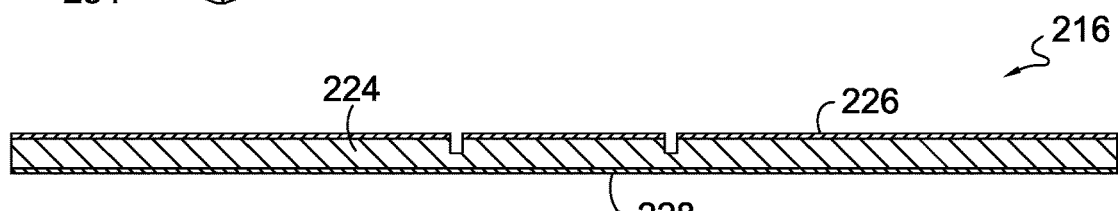
FIG. 14 depicts a cross section view taken along lines 14-14 of FIG. 12, in accordance with an aspect hereof.
Figure 13:
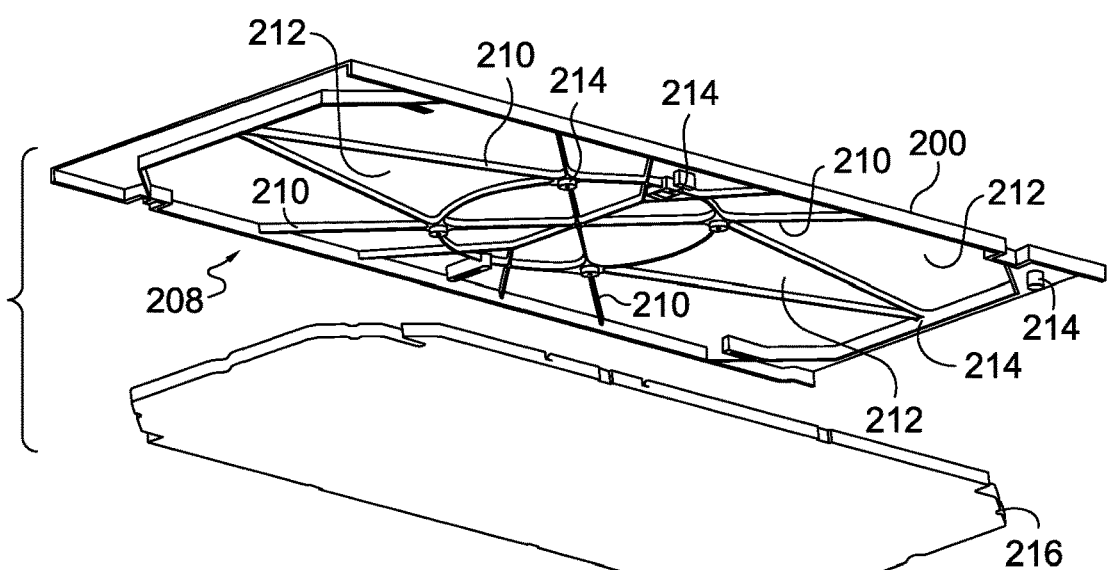
FIG. 13 depicts a bottom exploded perspective view similar to FIG. 12, in accordance with an aspect hereof.

Referring to FIGS. 12-14, an exemplary stiff lightweight platform 12 designed to reduce or limit inertial effects and to increase force measurement is depicted. The platform 12 includes a platform base 200 formed of a relatively stiff material that allows the securement of the mounting brackets 112 and the sliding arrangements 118 of the longitudinal scissor frameworks 100 and the lateral scissor frameworks 102. The exemplary platform base 200 can be constructed of a metal material, such as aluminum, and provides a first layer for the platform 12. The platform 12 includes a thin phenolic sheet 202 received in a shallow cavity 204 that forms the upper surface 206 of the platform base 200. The sheet 202 may be bonded or otherwise attached to the upper surface 206 to provide a more limited coefficient of friction with the belt 20. The platform base 200 includes a latticed lower surface 208 including a plurality of ribs 210 extending downwardly and forming a plurality of cavities 212. The latticed lower surface 208 provides rigidity to the platform 12 and also provides attaching bosses 214 for securement of mounting brackets 112 and sliding arrangements 118 as described herein. The bosses 214 also provide mounting surfaces for the resistance/rebound mechanisms, as will be more fully described below.

The platform 12 also includes an insert 216 constructed to fill the cavities 212 of the latticed lower surface 208 of the platform base 200. More specifically, an upper surface 218 of the insert 216 includes a plurality of grooves 220 for receiving the ribs 210 of the platform base 200. The upper surface 218 also includes apertures/recesses 222 for receiving the bosses 214 to facilitate mounting of the brackets 112 and the sliding arrangements 118. Referring to FIG. 14, the insert 216 may be made of a foam inner layer 224 with a top relatively thin layer of carbon fiber 226 and a bottom relatively thin layer of carbon fiber 228 bonded thereto. The foam can be polyurethane foam or any other suitable foam material. The carbon fiber/polyurethane sandwich construction of the insert 216 helps to increase the section height of the platform 12 to increase stiffness with reduced mass. The design of the platform 12 may therefore minimize or reduce the mass of the platform (and in turn reduce the inertia) while maintaining a natural frequency of over 200 Hz. The 200 Hz natural frequency is chosen to reduce or minimize the effect of platform deflection when performing force measurements on the treadmill 10, thus resulting in a more accurate load measurement.

The platform 12 also includes a frame 230 secured to the platform base 200 by any suitable structure such as, for example, bolts or rivets. The frame 230 includes longitudinal side members 232 and lateral side members 234 which surround the platform base 200. A pair of idler rollers 236 are rotatably mounted between the longitudinal side members 232 adjacent a respective lateral side member 234. The idler rollers 236 enhance the movement of the belt 20 over the upper surface 16 of the platform 12.

Resistance/Rebound Mechanism

Figure 15:
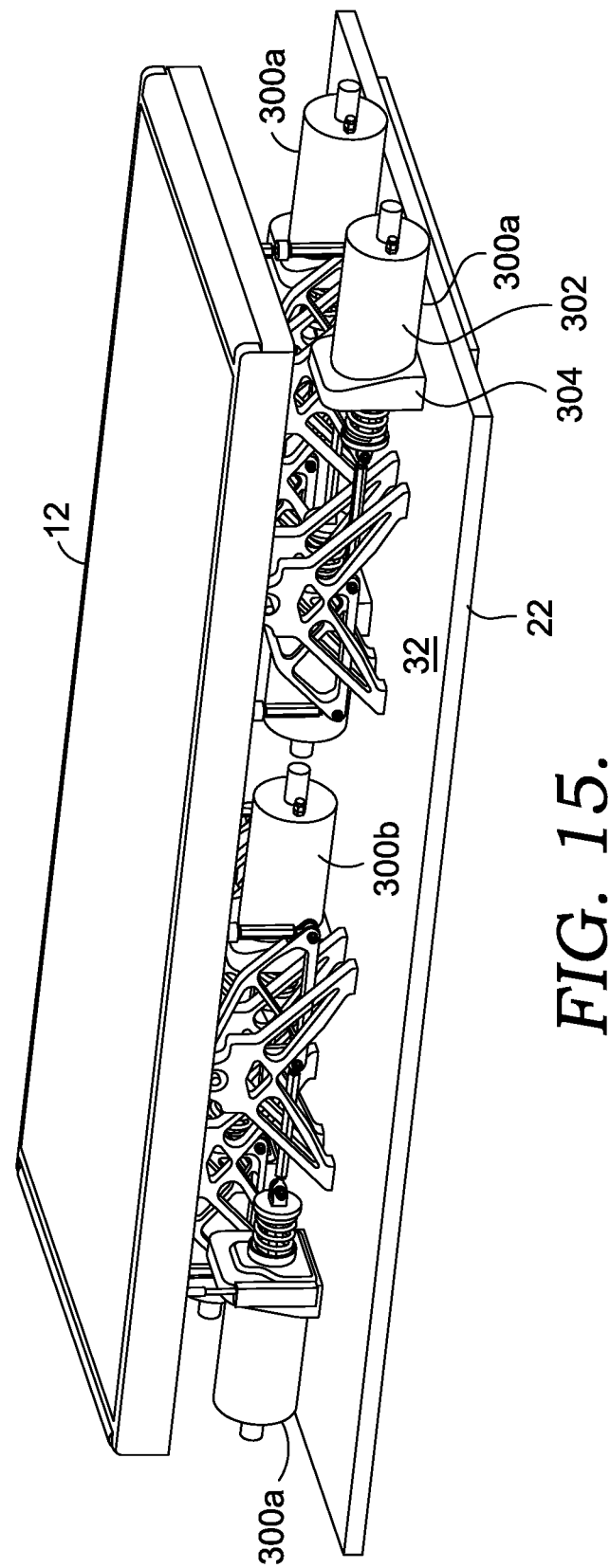
FIG. 15 depicts a top perspective view of a plurality of resistance/rebound mechanisms, in accordance with an aspect hereof.
Figure 16:
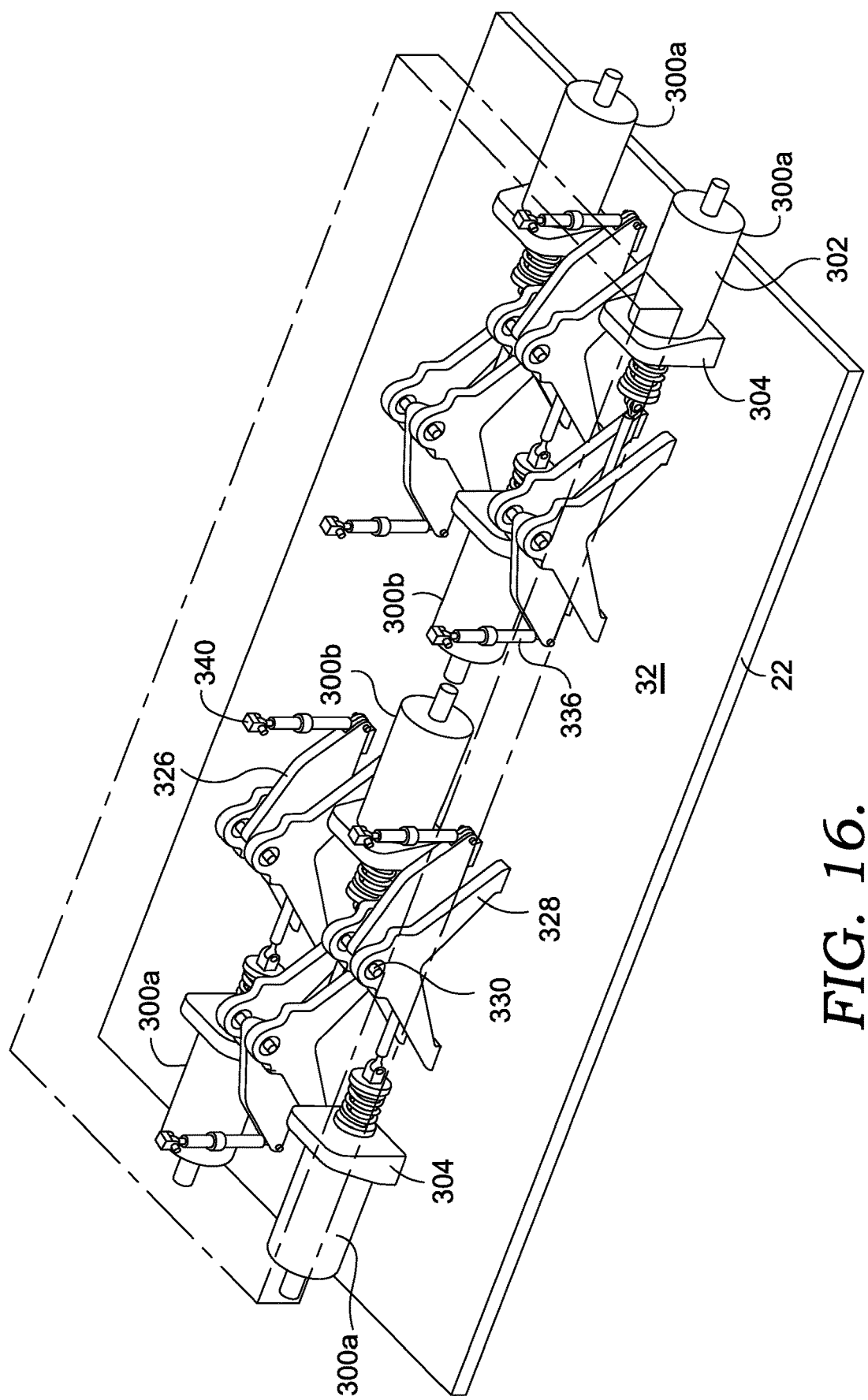
FIG. 16 depicts a top perspective view of the resistance/rebound mechanisms of FIG. 15 with a user platform shown in dashed lines, in accordance with an aspect hereof.
Figure 17:
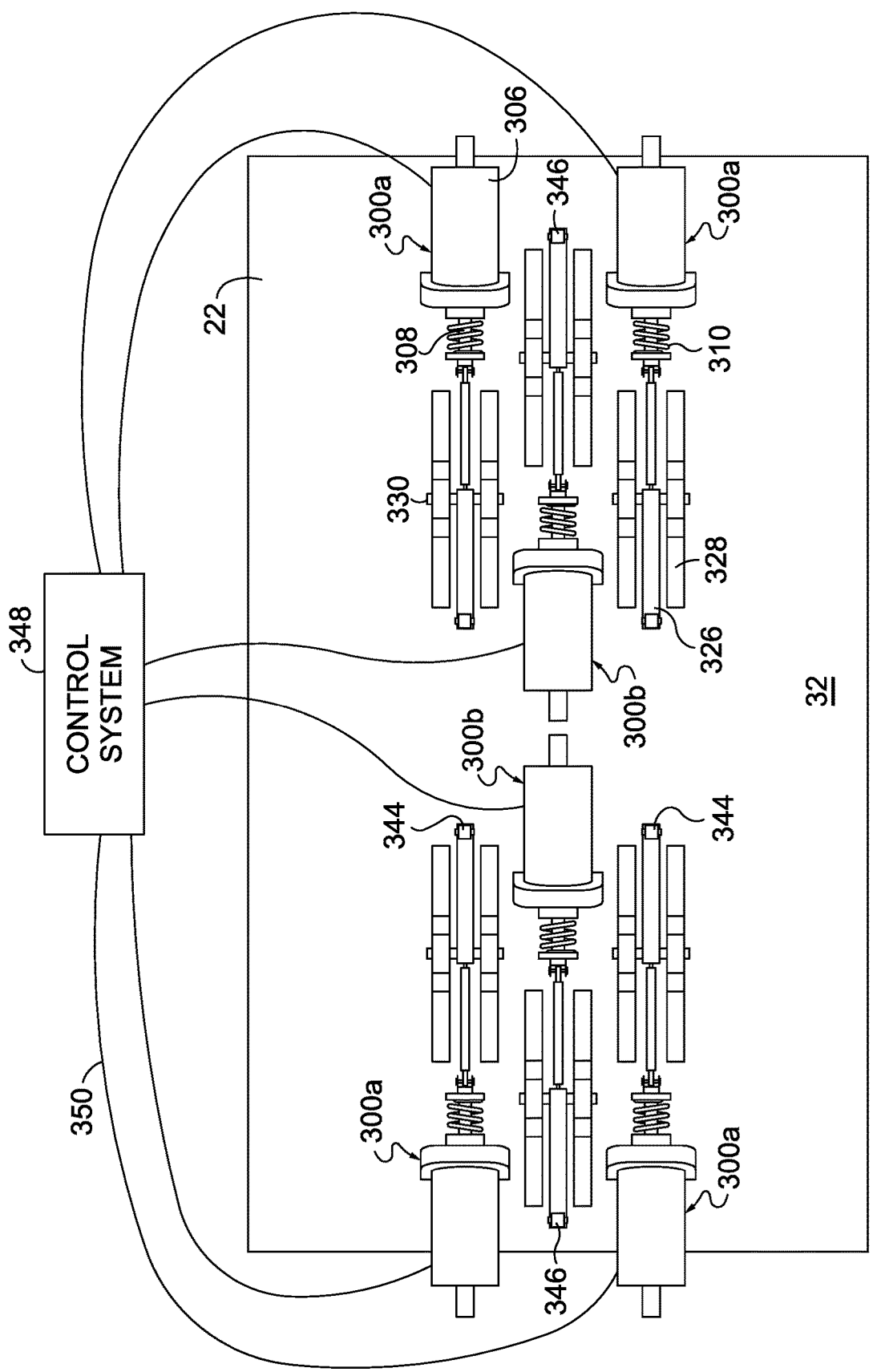
FIG. 17 depicts a top plan view of the resistance/rebound mechanisms of FIG. 15, in accordance with an aspect hereof.

Referring to FIGS. 15-20, a plurality of resistance/rebound mechanisms 300a/300b are depicted for controlling the vertical displacement of the platform 12 in both the downwardly and upwardly directions. As best shown in FIGS. 15-17, six resistance/rebound mechanisms 300a/300b are depicted for controlling the motion of the platform 12. The term "resistance" or "resistance force" as used herein includes the application of an upward force upon the platform 12 as the platform 12 is displaced downwardly during a foot strike such that the downward displacement is impeded. In this manner, the amount of downward displacement of the platform 12 that the user experiences during a foot strike can be selectively controlled. The term "rebound" or "rebound force" as used herein includes the application of an upward force upon platform 12 to move the platform 12 upwardly as the user begins to remove her/his foot in preparation for another stride. In this manner, a selectively controlled amount of upward force applied through platform 12 can be transferred to and assist a user during foot removal. Each resistance/rebound mechanism 300a/300b includes a linear actuator 302 mounted to the upper surface 32 of the plate 22 by a vertical mounting bracket 304. The mounting bracket 304 engages a cylinder 306 of the actuator 302 and supports the actuator 302 in an orientation that is generally horizontal and parallel to the plate 22. Positioned within each cylinder 306 is a movable piston 308. The piston 308 moves in relationship to the cylinder 306 in a linear manner. Thus, the piston 308 moves linearly in a direction that is generally parallel to the plate 22. Each actuator 302 is able to both power the extension and the retraction of its piston 308. It is the powering of the extension and retraction of the piston 308 that provides the resistance and rebound functions of the mechanisms 300a/300b. One suitable exemplary actuator is a voice coil actuator. Voice coil actuators (VCAs) are direct drive, limited motion devices that utilize a permanent magnet field and coil winding (conductor) to produce a force that is directly proportional to the electrical current applied to the coil. These non-commutated electromagnet devices are used in linear and rotary motion applications that require linear force or torque output, and high acceleration, or high frequency oscillation. VCAs allow for a millimeter by millimeter control of both the resistance to the downward movement of the platform 12 and the rebounding upward movement of the platform 12 in the aspects described herein. For the current application, a VCA can provide a combined performance for response time, load capacity, parasitic damping, resolution, availability, system cost, packaging, and controls complexity. The VCA may have in aspects hereof a response time in the 1 millisecond or lower range, which is sufficient to provide adequate responsiveness of the resistance/rebound force to the platform 12. The VCA also has a low internal damping due to the air gap, thus making it more nimble to control than other actuators, in certain circumstances.

Each actuator 302 also has a buffer spring 310 that is positioned around the piston 308 and between the cylinder front end 312 and an annular flange 314 fixed to the piston 308. The spring 310 can further smooth the application of the resistance and rebound forces to the platform 12. The springs 310 also may help to reduce the level of actuator current that is required to hold the platform 12 in its neutral position. In other words, the springs 310 serve to keep the platform 12 up when no power is supplied to an actuator 302.

A first end 316 of the piston 308 is pivotally connected to a first end 318 of an actuator linkage 320 by a pin/ball joint 322. A second end 323 of the linkage 320 is pivotally connected to a first pivot connection point 324 of a bell crank 326 by a pin/ball joint 322. As will be further described below, each bell crank 326 serves to convert the horizontal resistance/rebound force of its respective actuator 302 to a generally vertical resistance/rebound force that is applied to the platform 12.

Each bell crank 326 is pivotally mounted between a pair of vertical support frames 328 attached to and extending upwardly from the upper surface 32 of the plate 22. A pivot axle 330 is used to mount the bell cranks 326 between the respective support frames 328 and allow clockwise and counterclockwise rotation of the bell crank 326. Each bell crank 326 has a second connection point 332 pivotally attached to a first end 334 of a platform linkage 336 by a pin/ball joint 322. A second end 338 of the platform linkage 336 is pivotally connected to the platform 12 via a pin/ball joint 322 and a mounting bracket 340. Each mounting bracket 340 is attached to a boss 214 formed on the lower surface 208 of the platform base 200. Each platform linkage 336 can have a load cell transducer 342 for measuring the force input to the platform 12, as shown most clearly in FIG. 18.

Referring to FIGS. 18-20 the translation of the horizontal resistance/rebound motion of the actuator 302 to a substantially vertical resistance/rebound motion is described. As a downward force is applied to the platform 12 by for instance a foot strike of a runner, the platform 12 is vertically displaced downwardly in a stable manner by the vertical motion control mechanism 18. Each resistance/rebound mechanism 300a/300b will resist the downward displacement of the platform 12 to a certain degree, depending on the desired performance/measurement characteristics of the treadmill 10. The resistance is applied to the platform 12 via the mounting brackets 340 fixedly attached to the platform base 200 and pivotally attached to the platform linkage 336. As the platform 12 moves downwardly, the bell crank 326 is rotated in a counterclockwise direction about the pivot axle 330. As depicted in FIG. 20, the counterclockwise motion of the bell crank 326 results in retraction of the piston 308 of the linear actuator 302. This retraction is controlled by the actuator 302 applying a resistance force. In this manner, the amount of displacement of the platform 12 can be controlled on, for instance, a millimeter by millimeter basis. As is apparent, if it is desirable to apply a rebound force to platform 12 such that an upward force is applied to a runners foot, the linear actuator 302 is energized to extend the piston 308 to apply the rebound force. The extension of piston 308 results in clockwise motion of the bell crank 326 and, thus, the application of a vertically upward rebound force to the platform 12 via the linkage 336. The amount of rebound force can be applied in a tuned manner to enhance the performance and measurement capabilities of the treadmill 10. The load cell transducers 342 can be used to measure the force inputs on the platform 12 applied by a user. The measurements from transducers 342 can be used to adjust the resistance/rebound forces applied to the platform 12 by the actuators 302.

Additionally, the bell cranks 326 amplify the parallel linear motion of the actuators 302 such that the vertical motion traveled is greater than the horizontal linear motion. Referring to FIG. 19, the distance D2 between the second connection point 332 of the bell crank 326 and the pivot axle 330 is greater than the distance D1 between the first connection point 324 and the pivot axle 330. The relationship of D2 being greater than D1 results in any movement of the piston 308 being amplified such that the actual upward or downward vertical movement of the platform 12 is greater than that of the extension or retraction travel of the piston 308.

Thus, not only do the resistance/rebound mechanisms 300a/300b allow for the compact positioning of the linear actuators 302 by allowing them to be positioned generally horizontally with the force converted vertically, but they also amplify the travel distance of the linear actuator 302 as it is applied to the platform 12.

Referring to FIG. 17, the six resistance/rebound mechanisms 300a/300b are positioned generally toward the interior of the plate 22. In this manner, the longitudinal scissor frameworks 100 are positioned on each side of the cluster of the resistance/rebound mechanisms 300a/300b. Still further, the lateral scissor framework 102 cuts through the center of the cluster of resistance/rebound mechanisms 300a/300b. Each of the four peripheral resistance/rebound mechanisms 300a are connected to the platform base 200 at center connection points 344 via a suitable boss 214. Each of the two intermediate resistance/rebound mechanisms 300b are connected to the platform base 200 at connection points 346 adjacent the midpoints of the lateral edges of the platform 12. This spaced application of force to the platform 12 allows for smooth and even application of resistance and rebound forces. Any suitable control system 348 can be used to actuate the resistance/rebound mechanisms 300. For example, if VCAs are used as the resistance/rebound mechanisms 300a/300b and the control system 348 is electrical in nature, each resistance/rebound mechanism 300a/300b may then be electrically connected to the control system 348 via electrical connections 350. The control system 348 provides electrical signals/input to the resistance/rebound mechanisms 300a/300b so that downward displacement of the platform 12 is impeded/resisted by application of a force to the platform 12 and upward displacement is enhanced/rebounded also by applying a force to the platform 12. Measurement inputs from the load cell transducers 342 can be supplied to the control system 348 and used to determine the appropriate electrical/inputs to send to actuators 302. For instance, the control system 348 can be used to simulate a wide variety of running surfaces (e.g., sand, gravel, etc.) through adjustment of the resistance and rebound forces applied by the mechanisms 300a/300b to the platform 12.

Displacement-Based Lighting System

Figure 21:
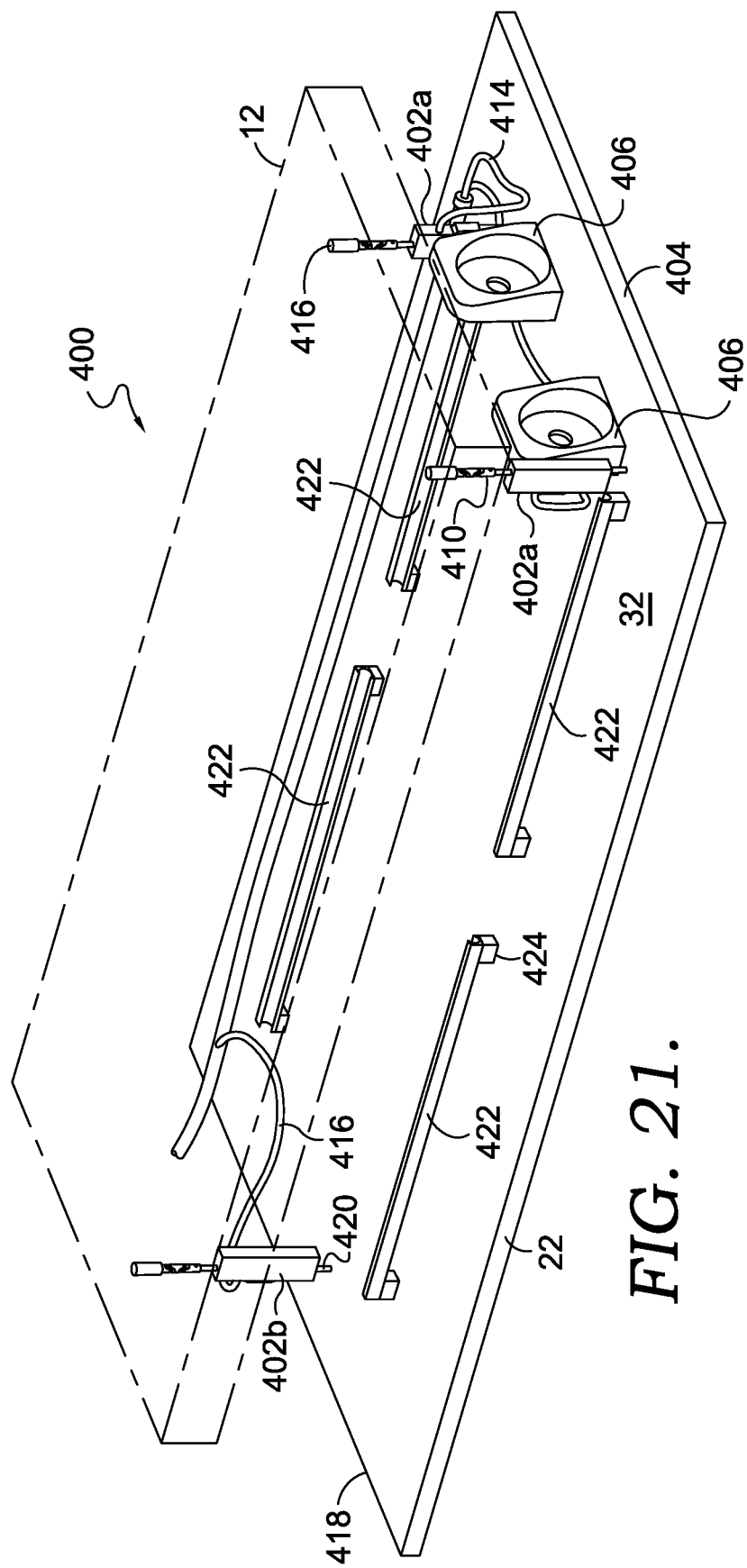
FIG. 21 depicts a top perspective view of a displacement-based lighting system with a user platform shown in dashed lines, in accordance with an aspect hereof.
Figure 22:
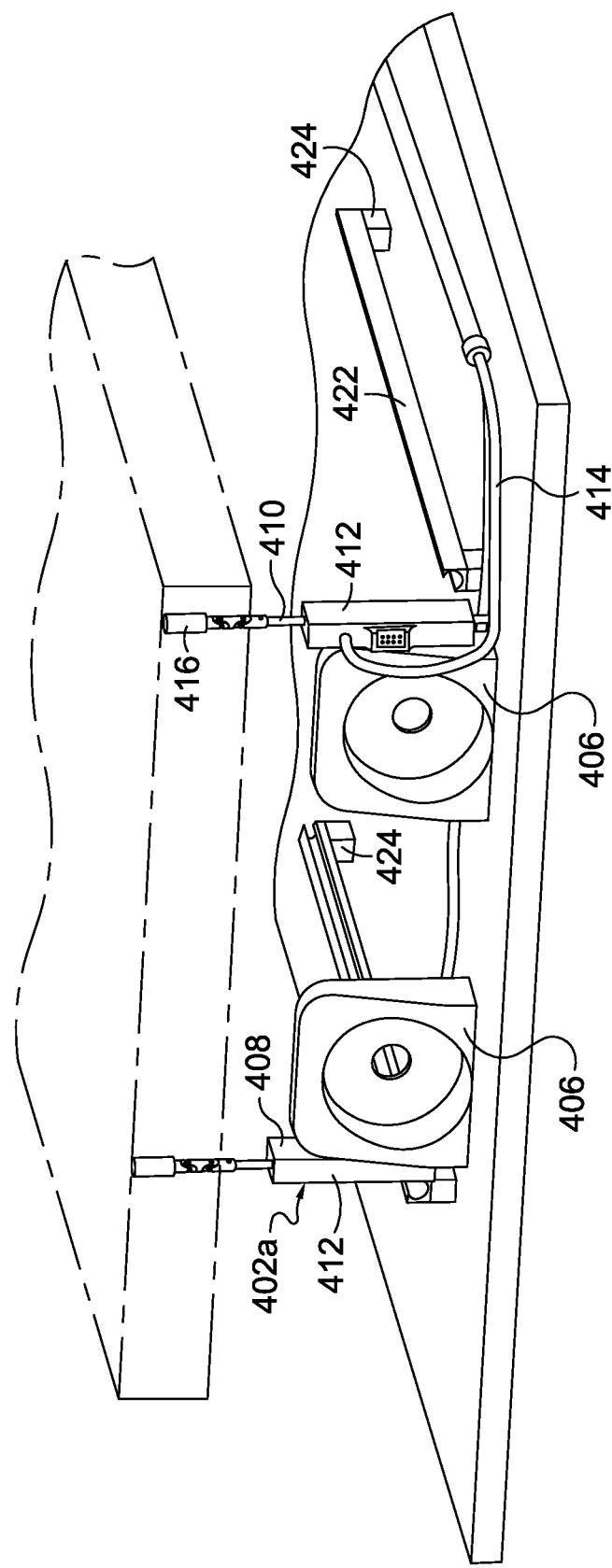
FIG. 22 depicts a partial end perspective view of the displacement-based lighting system of FIG. 21, in accordance with an aspect hereof.
Figure 23:
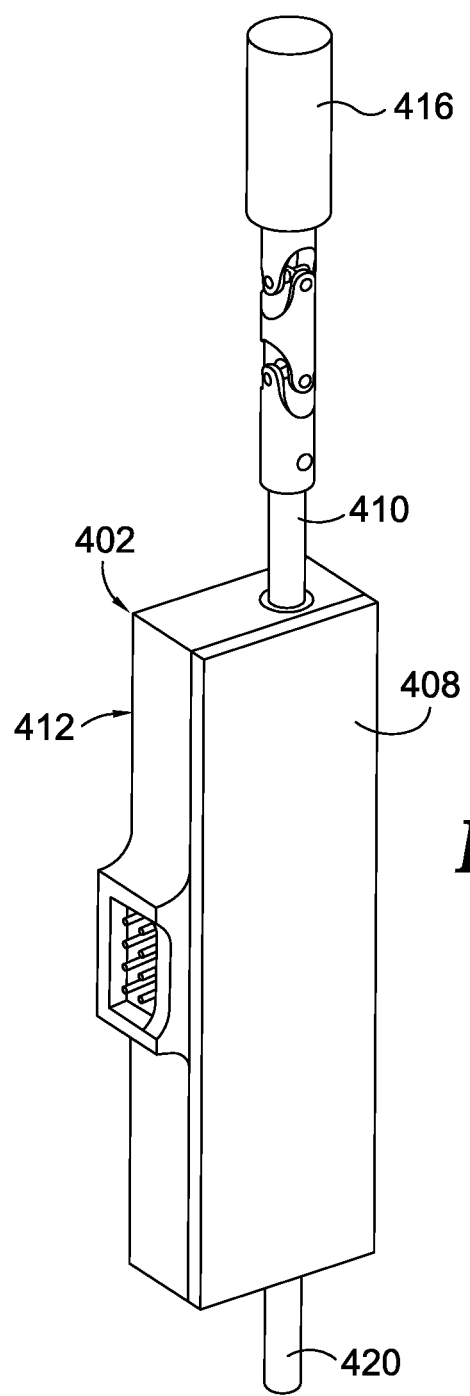
FIG. 23 depicts a top perspective view of a linear encoder used in the displacement based lighting system of FIG. 21, in accordance with an aspect hereof.

Referring to FIGS. 21-23, a displacement-based lighting system 400 is depicted and is capable of visually indicating the vertical downward displacement of the platform 12 from a normalized start position. The lighting system 400 includes three linear encoders 402a/402b positioned between and coupled to the platform 12 and the plate 22 of the base 14. Two of the linear encoders 402a are mounted adjacent the front end 404 of the plate 22 via mounting structures 406. The mounting structures 406 are secured to the upper surface 32 of the plate 22. A side surface 408 of the linear encoders 402a is attached to a respective mounting structure 406. Each linear encoder 402a/402b has a linear displaceable measurement piston 410 that is movable within the housing 412 of the encoder 402a/402b. As the piston 410 moves within the housing 412, an amount of displacement is sensed and an appropriate signal is sent via an electrical line 414 connected to the housing 412. An upper end 416 of the piston 410 is attached to the platform 12 such that up and down movement of the platform 12 cause linear movement of the piston 410 within the housing 412. In this manner, the encoders 402a/402b can sense the displacement of the platform 12 and send an appropriate signal. The lighting system 400 further includes a rear linear encoder 402b mounted to and adjacent a rear edge 418 of the plate 22. The encoder 402b has a lower mounting shaft 420 secured to the upper surface 32 of the plate 22 via a bracket arrangement (not shown). The upper end 416 of the encoder 402b secures to the platform 12 and the encoder 402b operates in the same manner as the encoders 402a.

The lighting system 400 also includes horizontally extending elongated lighting arrangements 422. The lighting arrangements 422 are mounted to the upper surface 32 of the plate 22 by brackets 424 and are capable of illuminating different colors corresponding to the displacement value of the platform 12. One suitable type of lighting arrangement 422 is a string LED (light emitting diode) which can illuminate for instance the colors green, yellow, and/or red with various intensities thereof. Each lighting arrangement 422 is electrically connected (either directly or indirectly) to the encoders 402 via electrical line 414.

The lighting system 400 is used on the treadmill 10 to inform the operator on the level of peak displacement that is being seen by the runner for each stride. During operation of the treadmill 10, the encoders 402 are used to sense the displacement of the platform 12 and to send and appropriate signal to the lighting arrangements 422 to reflect a specific color that corresponds to the displacement. For instance, one suitable color indication scale is: green is 0-15 mm, yellow is 15-30 mm, and red is over 30 mm. Other scales may be utilized for particular lighting segmentations. Lighting arrangements 422 can also be used to reflect additional treadmill information such as, for instance, the state of the treadmill 10. When the treadmill 10 is ready for use, the lighting arrangements 422 may turn dark green and when there is a fault with the treadmill 10, the lighting arrangement may turn dark red.

Position-Sensor-Based Speed Control System

Figure 24:
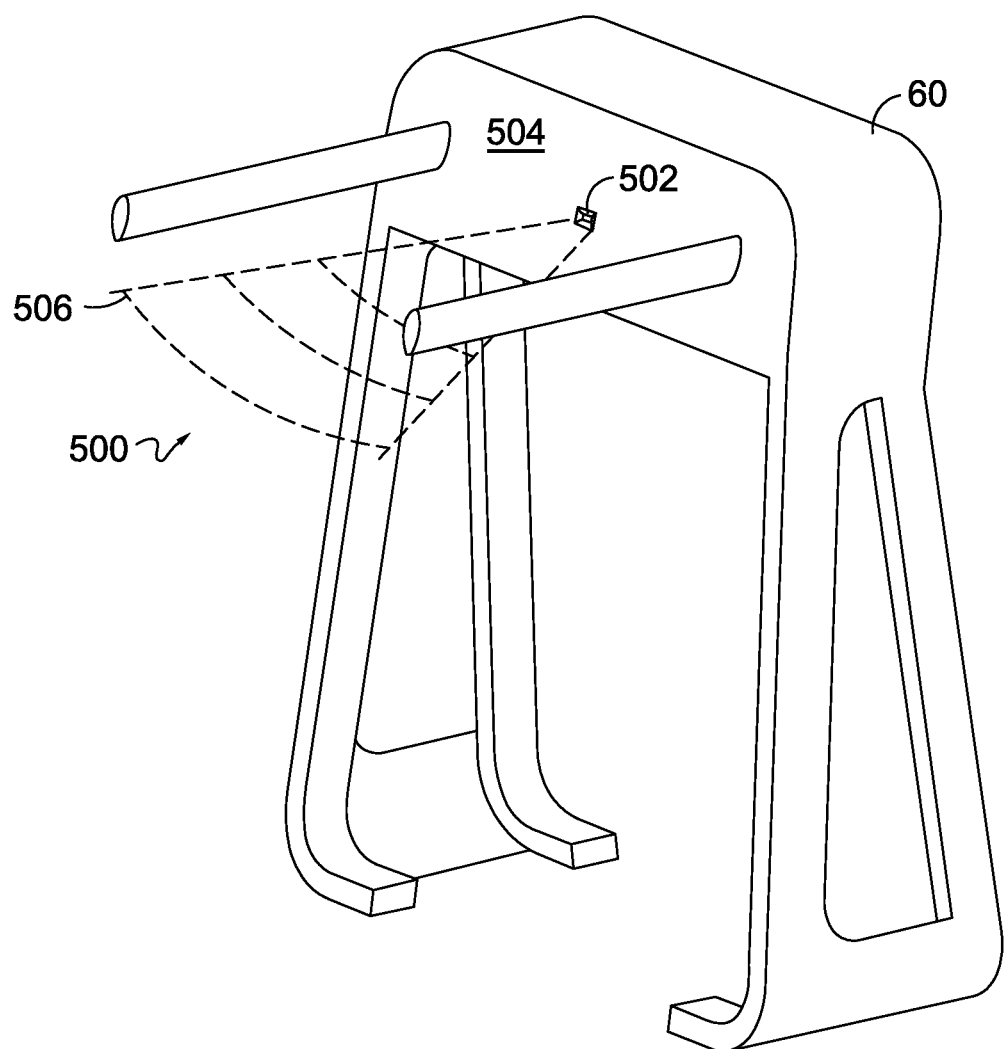
FIG. 24 depicts a top perspective view of the position-based speed control system, in accordance with an aspect hereof.

Referring to FIG. 24, a position-sensor-based speed control system 500 is depicted and is capable of sensing the position of the runner/walker and adjusting the speed of the treadmill 10 based upon the runner's position on the platform 12. The speed control system 500 includes a sensor 502 positioned on a user-facing surface 504 of the console 60. The sensor 502 can send out a signal 506 that is capable of determining the position of a treadmill user along the longitudinal length of the platform 12. The sensor 502 points towards the runner/user and can determine the distance from the sensor 502 to the runner/user. Based on the user's position, the belt 20 can be sped up or slowed down to keep the user in the middle of the platform 12. One suitable type of sensor 502 is an infrared sensor. The speed control system 500 can be used to actively control the speed of the belt 20 to slow the speed as the runner slows due to fatigue without manual speed adjustment.

Method of Operating a Treadmill

Figure 25:
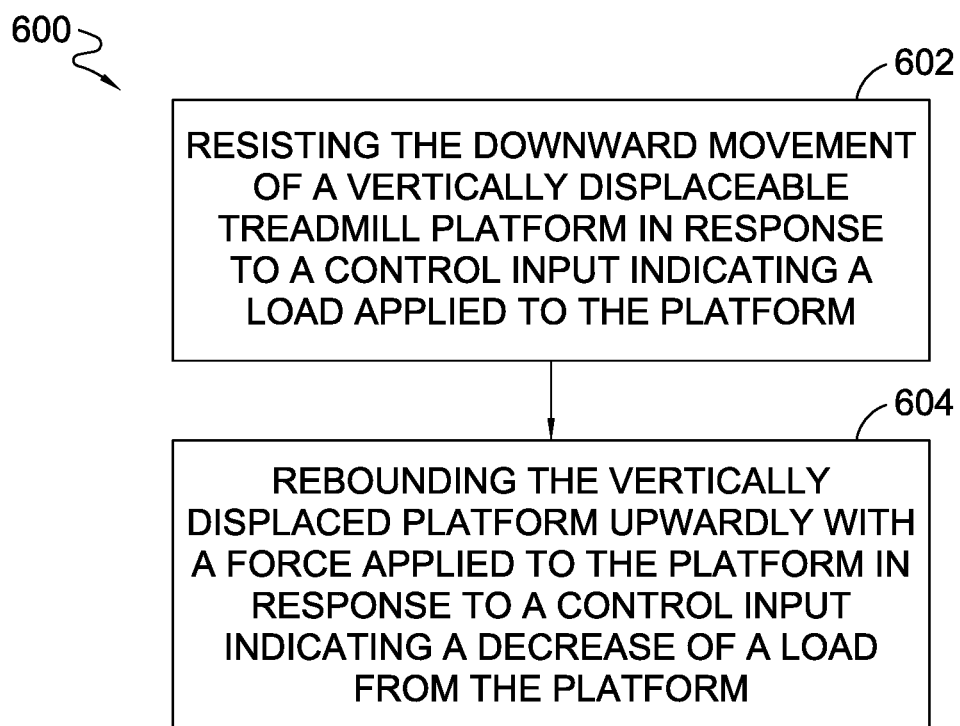
FIG. 25 depicts an exemplary method of operating a treadmill with a user platform movably attached to a base, in accordance with an aspect hereof.

Referring to FIG. 25, a method 600 of operating a treadmill, such as the treadmill 10 described herein, with a base, such as the base 14 described herein, and a vertically displaceable platform, such as the platform 12 described herein, is depicted. The method 600 includes the step 602 of resisting the downward movement of the platform in response to a control input indicating a load is applied to the platform. The resistance applied to the platform may be controllable at every millimeter of travel in the downward direction. The method 600 also includes the step 604 of rebounding the platform upwardly with a force applied to the platform in response to a control signal indicating a decrease of a load on the platform. The rebound responsiveness of the platform may be controllable at every millimeter of travel in the upward direction.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

While specific elements and steps are discussed in connection to one another, it is understood that any element and/or steps provided herein are contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A treadmill, comprising:
a base;
a platform movably coupled to the base;
a drive roller rotatably coupled to the base;
a belt extending across the drive roller and the platform; and
a linear actuator coupled between the base and the platform, the linear actuator comprising a voice coil actuator, wherein the linear actuator is coupled to a piston.

2. The treadmill of claim 1, wherein the linear actuator powers both extension and retraction of the piston.

3. The treadmill of claim 1, wherein the piston is extendable and retractable along a direction approximately parallel to a length of the platform.

4. The treadmill of claim 3, further comprising a bell crank pivotally coupled to the base at a pivot point, wherein the bell crank comprises:
a first end coupled to the piston, and
a second end coupled to the platform,
wherein the bell crank converts linear movement of the piston into a force applied approximately perpendicular to the platform.

5. The treadmill of claim 4,
wherein the first end of the bell crank is spaced a first distance from the pivot point and the second end of the bell crank is spaced a second distance from the pivot point, and
wherein the second distance is greater than the first distance so that a linear movement of the piston is amplified when applied to the platform.

6. The treadmill of claim 1, further comprising a pair of idler rollers rotatably mounted on the treadmill.

7. The treadmill of claim 1, wherein the linear actuator is coupled to a load cell transducer.

8. The treadmill of claim 1, wherein the linear actuator comprises one of a plurality of linear actuators each coupled to a corresponding piston.

9. The treadmill of claim 8, wherein the plurality of linear actuators comprise part of a resistance/rebound mechanism coupled to the base and to the platform, the resistance/rebound mechanism capable of providing selectively controlled displacement resistance in a first direction and selectively controlled rebound responsiveness in an opposite second direction.

10. A resistance/rebound mechanism for a treadmill, comprising:
a linear actuator comprising a voice coil actuator;
a transducer; and
a bell crank,
wherein the linear actuator is coupled to the bell crank, and
wherein extension or retraction of the linear actuator along a first direction translates into movement of the bell crank in a second direction that is approximately perpendicular to the first direction.

11. The resistance/rebound mechanism of claim 10, wherein the bell crank comprises a pivot point and a linkage.

12. The resistance/rebound mechanism of claim 11, wherein the linkage comprises a first end and a second end, wherein the first end is coupled to the bell crank at a pivot connection, and wherein the second end is coupled to a mounting bracket.

13. The resistance/rebound mechanism of claim 10, wherein the bell crank comprises one of a plurality of bell cranks.

14. The resistance/rebound mechanism of claim 10, wherein the resistance/rebound mechanism is capable of providing selectively controlled displacement resistance in a first direction and selectively controlled rebound responsiveness in an opposite second direction.

15. The resistance/rebound mechanism of claim 10, further comprising a buffer spring coupled to the linear actuator.

16. The resistance/rebound mechanism of claim 10, wherein the linear actuator is coupled to the bell crank at a pivot joint or a ball joint.

17. A system for a treadmill, comprising:
 a plurality of resistance/rebound mechanisms each comprising:
  a linear actuator that comprises a voice coil actuator;
  a transducer, and
  a bell crank;
  wherein extension or retraction of the linear actuator along a first direction translates into movement of the bell crank in a second direction that is approximately perpendicular to the first direction.

18. The system of claim 17, wherein the linear actuator is coupled to a piston, and wherein the linear actuator powers both extension and retraction of the piston.

19. The system of claim 17, wherein the plurality of resistance/rebound mechanisms comprise at least four resistance/rebound mechanisms positioned on a surface of the treadmill.

* * * * *